(12) United States Patent
Kidoura et al.

(10) Patent No.: US 11,988,986 B2
(45) Date of Patent: May 21, 2024

(54) IMAGE FORMING SYSTEM HAVING SHEET LAMINATOR

(71) Applicants: Yasunobu Kidoura, Kanagawa (JP); Akira Kunieda, Tokyo (JP); Yohsuke Haraguchi, Kanagawa (JP); Hirofumi Horita, Kanagawa (JP); Satoshi Kuno, Tokyo (JP); Koju Kawakami, Tokyo (JP); Ryohsuke Akaishi, Kanagawa (JP)

(72) Inventors: Yasunobu Kidoura, Kanagawa (JP); Akira Kunieda, Tokyo (JP); Yohsuke Haraguchi, Kanagawa (JP); Hirofumi Horita, Kanagawa (JP); Satoshi Kuno, Tokyo (JP); Koju Kawakami, Tokyo (JP); Ryohsuke Akaishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/157,424

(22) Filed: Jan. 20, 2023

(65) Prior Publication Data
US 2023/0244164 A1 Aug. 3, 2023

(30) Foreign Application Priority Data

Feb. 1, 2022 (JP) .................................. 2022-014014
Nov. 14, 2022 (JP) .................................. 2022-181721

(51) Int. Cl.
*G03G 15/00* (2006.01)
*B41F 19/00* (2006.01)
(Continued)

(52) U.S. Cl.
CPC ....... *G03G 15/6573* (2013.01); *B41F 19/001* (2013.01); *B41F 23/08* (2013.01);
(Continued)

(58) Field of Classification Search
CPC .... G03G 15/55; G03G 15/70; G03G 15/6573; G03G 15/6582; G03G 2215/00426;
(Continued)

(56) References Cited

U.S. PATENT DOCUMENTS

2020/0247636 A1   8/2020  Furuhashi et al.
2021/0289090 A1*  9/2021  Monma .............. H04N 1/00602
(Continued)

FOREIGN PATENT DOCUMENTS

JP   2010-160353   7/2010
JP   2020-121868   8/2020
JP   2021-176791   11/2021

*Primary Examiner* — Robert B Beatty
(74) *Attorney, Agent, or Firm* — Harness, Dickey & Pierce, P.L.C.

(57) ABSTRACT

An image forming system includes an image forming apparatus and a sheet laminator. The image forming apparatus forms an image on a sheet being conveyed as an inner sheet. The sheet laminator performs a sheet laminating operation on a two-ply sheet in which the sheet conveyed from the image forming apparatus is inserted between two sheets of the two-ply sheet. The sheet laminator includes a heater and circuitry. The heater heats the two-ply sheet during the sheet laminating operation. The circuitry is to execute a control mode when a specific abnormal event occurs among a plurality of abnormal events that occurs in the image forming apparatus, where the control mode maintains heating by the heater of the sheet laminator for a predetermined time and interrupt the heating by the heater when an abnormal event other than the specific abnormal event occurs.

13 Claims, 22 Drawing Sheets

(51) Int. Cl.
| | |
|---|---|
| *B41F 23/08* | (2006.01) |
| *B41J 11/00* | (2006.01) |
| *B41M 7/00* | (2006.01) |
| *G03G 15/20* | (2006.01) |

(52) U.S. Cl.
CPC ........ *B41J 11/0015* (2013.01); *B41M 7/0027* (2013.01); *G03G 15/205* (2013.01); *G03G 15/5004* (2013.01); *G03G 15/55* (2013.01); *G03G 15/6582* (2013.01); *G03G 15/70* (2013.01); *G03G 2215/00426* (2013.01)

(58) Field of Classification Search
CPC .......... G03G 2215/00805; G03G 2215/00548; B41F 19/001; B41F 23/08; B41M 7/0027; B41M 7/0054; B41M 2205/34; B32B 37/226; B32B 38/004; B32B 2037/0069; B32B 2037/0061; B32B 2041/04; B65H 37/00; B65H 2801/27; B41J 11/0015
USPC ......... 399/342, 407; 156/277, 383, 384, 387
See application file for complete search history.

(56) References Cited

U.S. PATENT DOCUMENTS

| | | | | |
|---|---|---|---|---|
| 2021/0347589 | A1* | 11/2021 | Suzuki | B65H 7/02 |
| 2021/0356899 | A1* | 11/2021 | Takahashi | B32B 37/142 |
| 2021/0387467 | A1* | 12/2021 | Asano | G06F 3/1217 |
| 2022/0291620 | A1 | 9/2022 | Fujita et al. | |

\* cited by examiner

IMAGE FORMING SYSTEM HAVING SHEET LAMINATOR

CROSS-REFERENCE TO RELATED APPLICATIONS

This patent application is based on and claims priority pursuant to 35 U.S.C. § 119(a) to Japanese Patent Application Nos. 2022-014014, filed on Feb. 1, 2022, and 2022-181721, filed on Nov. 14, 2022, in the Japan Patent Office, the entire disclosure of each of which is hereby incorporated by reference herein.

BACKGROUND

Technical Field

Embodiments of the present disclosure relate to an image forming system including a copier, a printer, a facsimile machine, or a multifunction peripheral having at least two of copying, printing, and facsimile functions, and a post-processing apparatus.

Background Art

Various types of image forming systems in the related art are known to include a sheet laminator that performs the sheet laminating operation on a two-ply sheet in which an inner sheet is inserted in two sheets of the two-ply sheet, and an image forming apparatus that forms an image on an inner sheet.

Specifically, a sheet laminator included in such an image forming system in the related art separates (peels) two sheets of a lamination sheet (e.g., a two-ply sheet) in the two sheets are bonded at one ends of the lamination sheet, and inserts an inner paper (e.g., an inner sheet) between the two sheets. Then, the lamination sheet in which the inner paper is inserted is conveyed to the sheet lamination device in which a heater (heating unit) is disposed, so that the sheet lamination device performs the sheet laminating operation on the lamination sheet with application of heat and pressure to the laminated sheet.

SUMMARY

Embodiments of the present disclosure described herein provide a novel image forming system including an image forming apparatus and a sheet laminator. The image forming apparatus forms an image on a sheet being conveyed as an inner sheet. The sheet laminator performs a sheet laminating operation on a two-ply sheet in which the sheet conveyed from the image forming apparatus is inserted between two sheets of the two-ply sheet. The sheet laminator includes a heater and circuitry. The heater heats the two-ply sheet during the sheet laminating operation. The circuitry is to execute a control mode when a specific abnormal event occurs among a plurality of abnormal events that occurs in the image forming apparatus, where the control mode maintains heating by the heater of the sheet laminator for a predetermined time and interrupt the heating by the heater when an abnormal event other than the specific abnormal event occurs.

BRIEF DESCRIPTION OF THE SEVERAL VIEWS OF THE DRAWINGS

Exemplary embodiments of this disclosure will be described in detail based on the following figures, wherein.

Figure 1:
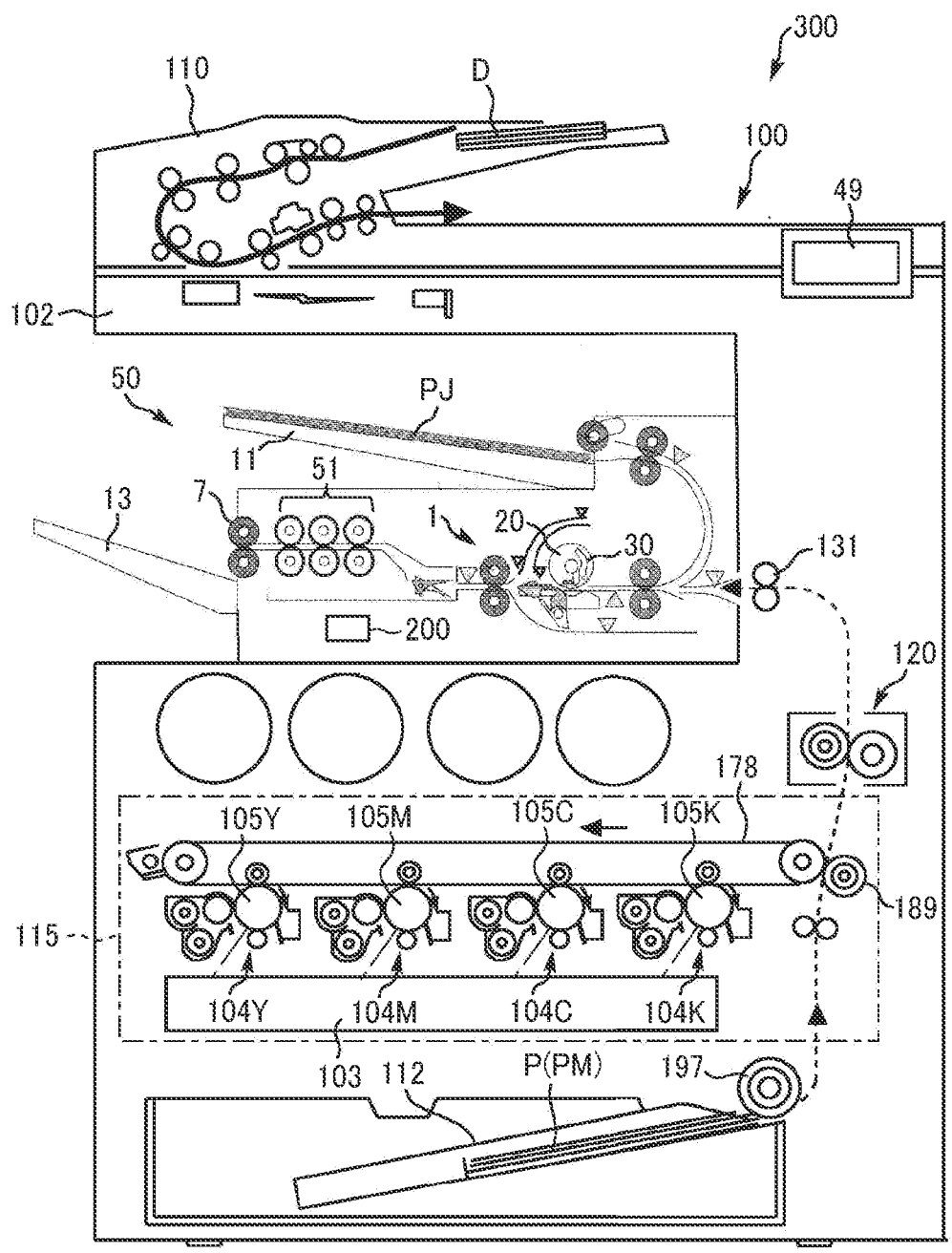
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of an image forming apparatus and an image forming system, according to embodiments of the present disclosure, with reference to the drawings. Identical parts or equivalents are given identical reference numerals and redundant descriptions are summarized or omitted accordingly.

A description is now given of the configuration and functions of an image forming system 300 according to an embodiment of the present disclosure, with reference to FIG. 1.

FIG. 1 is a diagram illustrating an overall configuration of an image forming system 300 according to an embodiment of the present disclosure.

As illustrated in FIG. 1, the image forming system 300 according to the present embodiment includes a sheet laminator 50 (sheet lamination device 51) having a function of sheet lamination and is disposed in the inner body of an image forming apparatus 100. To be more specific, the inner body of the image forming apparatus 100 is a space between a document reading device 102 and an image forming device 115.

The image forming apparatus 100 is the part of the image forming system 300 other than the sheet laminator 50. In other words, the image forming system 300 includes the image forming apparatus 100 and the sheet laminator 50. The image forming apparatus 100 includes the image forming device 115, an apparatus sheet tray 112, a fixing device 120, a document feeder 110, and a document reading device 102.

The sheet laminator 50 includes a unit sheet tray 11, a sheet separation device 1, a sheet lamination device 51, and an ejection tray 13.

Further, as illustrated in FIG. 1, the image forming system 300 includes the operation display panel 49 that functions as an operation display on the exterior of the image forming system 300 to display various kinds of information about the image forming system 300 and input various kinds of commands.

The sheet separation device 1 separates a non-bonding portion of a two-ply sheet PJ in which two sheets P1 and P2 are overlapped and bonded together at one end of the two-ply sheet PJ as a bonding portion A of the two-ply sheet PJ (see FIGS. 12A to 12E and other drawings). The sheet separation device 1 includes a winding roller 20, a third conveyance roller pair 6, and a moving mechanism 30. Details of the sheet separation device 1 are described below, with reference to FIG. 2 and other drawings.

The unit sheet tray 11 functions as a first sheet feeder to feed the two-ply sheet PJ toward the sheet separation device 1. A lamination sheet having at least two sheets that can be thermally bonded with each other is used as the two-ply sheet PJ.

The sheet lamination device 51 performs sheet lamination on the two-ply sheet PJ while an inner sheet PM is inserted between two sheets, which are a first sheet P1 and a second sheet P2, separated from each other by the sheet separation device 1. In other words, the sheet lamination device 51 applies heat and pressure on the non-bonding portion of the two sheets (i.e., the first sheet P1 and the second sheet P2 constructing the two-ply sheet PJ) to bond the two sheets together while the inner sheet PM on which a desired image is printed by the image forming apparatus 100 as described below. The sheet lamination device 51 is disposed downstream from the sheet separation device 1 in the sheet conveyance direction, that is, the downstream side in the forward direction and the left side in FIG. 2. The sheet lamination device 51 includes a plurality of thermal pressure roller pairs 51a, each of which applies heat and pressure to the two-ply sheet PJ while conveying the two-ply sheet PJ in the forward direction with the inner sheet PM being inserted in the two-ply sheet PJ. Further, a fourth sheet conveyance passage K6 is disposed between the third conveyance roller pair 6 and the sheet lamination device 51.

A heater 51b serving as a heating unit is provided inside each of the plurality of thermal pressure roller pairs 51a of the sheet lamination device 51.

A controller 200 (see FIG. 1) controls to heat the heater 51b (heating unit), so that the thermal pressure roller pairs 51a are heated due to radiant heat by the heating of the heater 51b. Details of the controller 200 will be described below. With the heated thermal pressure roller pairs 51a, the sheet laminating operation is performed on the two-ply sheet PJ in which the inner sheet PM is inserted.

The ejection tray 13 functions as an ejection unit on which the two-ply sheet PJ (and the inner sheet PM) is stacked when the two-ply sheet PJ is ejected after the sheet laminator 50 of the image forming apparatus 100 has performed the sheet laminating operation on the two-ply sheet PJ.

The sheet separation device 1, the unit sheet tray 11, the sheet lamination device 51, and the ejection tray 13 are integrated in a single unit as the sheet laminator 50. The sheet laminator 50 is disposed on the outside of the image forming apparatus 100 (i.e., the inner body of the image forming apparatus 100) so as to be exposed outside. Due to such a configuration, a user can directly take out the two-ply sheet PJ (and the inner sheet PM) from the ejection tray 13 after the sheet laminating operation is performed on the two-ply sheet PJ (and the inner sheet PM) and the two-ply sheet PJ (and the inner sheet PM) is stacked on the ejection tray 13.

On the other hand, the apparatus sheet tray 112 is detachably attached to the image forming apparatus 100. The apparatus sheet tray 112 functions as a second sheet feeder to feed the inner sheet PM toward the image forming device 115. The inner sheet PM is a sheet such as a paper sheet to be inserted between the two sheets (i.e., the first sheet P1 and the second sheet P2) of the two-ply sheet PJ while the non-bonding portion of the two-ply sheet PJ is separated in the sheet separation device 1.

The image forming device 115 of the image forming apparatus 100 forms an image (toner image) on the surface of the inner sheet PM that is fed from the apparatus sheet tray 112 (serving as a second sheet feeder) and is conveyed in a predetermined sheet conveyance direction that is a direction indicated by arrow with a broken line in FIG. 1. The image forming device 115 includes a plurality of image forming units 104Y, 104M, 104C, and 104K. In particular, the image forming apparatus 100 according to the present embodiment forms an image with toner (e.g., dry toner), on the surface of the inner sheet PM. In other words, the image forming apparatus 100 according to the present embodiment is an electrophotographic image forming apparatus.

The fixing device 120 serving as a heat source is disposed downstream from the image forming device 115 in the sheet conveyance direction (of the inner sheet PM). The fixing device 120 fixes the image formed with toner (toner image) on the surface of the inner sheet PM, to the inner sheet PM. The fixing device 120 includes a fixing roller and a pressure roller. The fixing roller has a heater inside the fixing roller. The pressure roller is pressed in contact with the fixing roller, forming a fixing nip region with the fixing roller. The fixing device 120 heats and presses the toner image on the surface of a sheet that is conveyed to the fixing nip region, to fix the toner image to the surface of the sheet.

As illustrated in FIG. 1, in the present embodiment, the sheet laminator 50 (including the sheet separation device 1 and the sheet lamination device 51) is disposed downstream from the image forming apparatus 100 in the sheet conveyance direction of the inner sheet PM. To be more specific, the sheet laminator 50 is disposed so as to receive the inner sheet PM ejected from an ejection roller pair 131 that is provided in the image forming apparatus 100.

Then, in the image forming apparatus 100 according to the present embodiment, the two-ply sheet PJ fed from the unit sheet tray 11 is conveyed to the sheet separation device 1 without passing by the image forming apparatus 100. Specifically, the two-ply sheet PJ fed from the unit sheet tray 11 is conveyed to the sheet separation device 1 without passing through the image forming device 115 and the fixing device 120 serving as a heat source. To be more specific, the two-ply sheet PJ does not pass through the image forming apparatus 100 and is directly conveyed from the unit sheet tray 11 toward the sheet separation device 1 in the sheet laminator 50.

According to this configuration, the image forming apparatus 100 is reduced in size, when compared with a configuration in which the image forming apparatus 100 includes a sheet separation device and a space for temporarily retaining the inner sheet PM with the image formed on the surface, inside the image forming apparatus 100.

Further, an operation to feed the inner sheet PM from the apparatus sheet tray 112 and form an image on the inner sheet PM is performed concurrently with an operation in which to feed the two-ply sheet PJ from the unit sheet tray 11 and separate the two-ply sheet PJ. For this reason, the time that takes to finish inserting the inner sheet PM into the two-ply sheet PJ is reduced, thereby enhancing the print productivity of the image forming apparatus 100.

Further, the two-ply sheet PJ does not pass through the fixing device 120 serving as a heat source and the non-bonding portion of the two-ply sheet PJ is separated by the sheet separation device 1. In this state, the two-ply sheet PJ receives the inner sheet PM that has passed through the fixing device 120 in which the image on the surface of the inner sheet PM is fixed to the inner sheet PM. Accordingly, the above-described configuration prevents the sheet separation failure from causing due to the thermal bonding of the two-ply sheet PJ before the inner sheet PM is inserted into the two-ply sheet PJ.

In the present embodiment, the above-described mode in which the inner sheet PM is inserted into the two-ply sheet PJ to perform the sheet laminating operation is referred to as a "sheet lamination mode." Apart from the sheet lamination mode, a "regular print mode" is also selectable.

The regular print mode is a control mode to cause a sheet P such as a paper material to be ejected to the outside of the image forming apparatus 100 without performing the sheet laminating operation. In the regular print mode, the two-ply sheet PJ is not fed from the unit sheet tray 11 (first sheet feeder), a sheet P such as a paper material fed from the apparatus sheet tray 112 (second sheet feeder), the image forming device 115 forms an image on the surface of the sheet P, and the sheet P is conveyed via the fixing device 120 (heat source) to the outside of the image forming apparatus 100.

Figure 13:
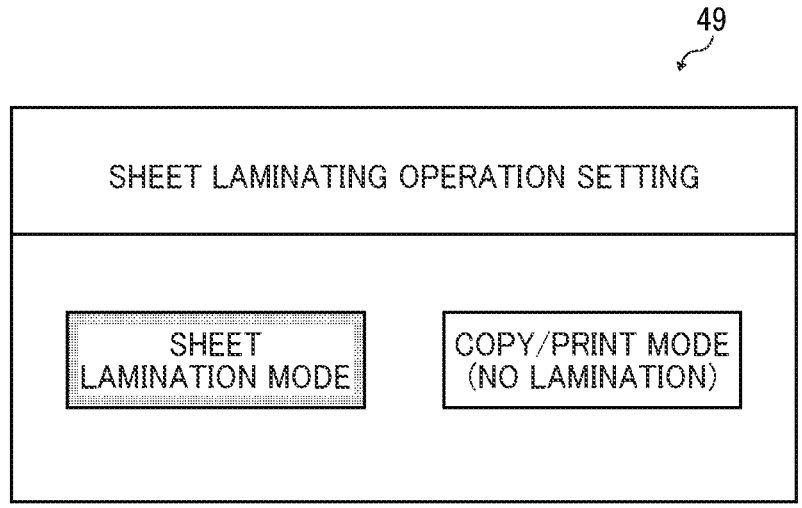
FIG. 13 is a diagram illustrating a display screen on an operation display panel.

FIG. 13 is a diagram illustrating a display screen on an operation display panel 49.

In the present embodiment, a user operates an operation display panel 49 to display a display screen as illustrated in FIG. 13. The "copy/print mode" button is selected when executing the regular print mode. The "sheet lamination mode" button is selected when executing the sheet lamination mode. Then, when the regular print mode is executed, even after the sheet P is ejected from the image forming apparatus 100 and conveyed to the sheet laminator 50, the sheet inserting operation to the two-ply sheet PJ and the sheet laminating operation are not performed on the sheet P, but the sheet P is ejected from the sheet laminator 50 to be stacked on the ejection tray 13.

A description below is given of the image forming operation (printing operation) in the image forming apparatus 100, with reference to FIG. 1.

In the image forming apparatus 100 with reference to FIG. 1, multiple pairs of sheet conveying rollers disposed in the document feeder 110 feed an original document D from a document loading table and convey the original document D in a direction indicated by arrow in FIG. 1. By so doing, the original document D passes over the document reading device 102. At this time, the document reading device 102 optically reads image data of the original document D passing over the document reading device 102.

The image data optically read by the document reading device 102 is converted into electrical signals and transmitted to a writing device 103. The writing device 103 emits laser beams onto photoconductor drums 105Y, 105M, 105C, and 105K, based on the electrical signals of the image data in each of colors, respectively. By so doing, an exposure process is executed by the writing device 103.

After the exposing process is executed, a charging process, the exposure process, and a developing process are executed on the photoconductor drums 105Y, 105M, 105C, and 105K of respective image forming units 104Y, 104M, 104C, and 104K to form desired images on the photoconductor drums 105Y, 105M, 105C, and 105K, respectively.

The images formed on the photoconductor drums 105Y, 105M, 105C, and 105K are then transferred and superimposed onto an intermediate transfer belt 178 to form a color image. The color image formed on the intermediate transfer belt 178 is transferred onto the surface of the sheet P (which is a sheet to function as the inner sheet PM) fed and conveyed by a sheet feed roller 197 from the apparatus sheet tray 112 (second sheet feeder) at a position at which the intermediate transfer belt 178 faces a secondary transfer roller 189.

After the color image is transferred onto the surface of the sheet P (that is, the inner sheet PM), the sheet P is conveyed to the position of the fixing device 120 that functions as a heat source. The fixing device 120 fixes the transferred color image formed on the surface of the sheet P, to the sheet P.

The sheet P is then ejected from the image forming apparatus 100 by an ejection roller pair 131, and is fed as the inner sheet PM, into the sheet laminator 50. At this time, when the sheet laminator 50 receives the inner sheet PM, the sheet laminator 50 has substantially completed the operation described with reference to FIGS. 6A to 9C (that is, the operation to separate the two-ply sheet PJ) and performs the operation described with reference to FIGS. 10A to 10C (that is, the operation to insert the inner sheet PM into the two-ply sheet PJ) after the sheet laminator 50 receives the inner sheet PM. Further, after the sheet lamination device 51 has completed the sheet laminating operation on the two-ply sheet PJ in which the inner sheet PM is inserted, the ejection roller pair 7 ejects the two-ply sheet PJ to the outside of the sheet lamination device 51 to stack the two-ply sheet PJ on the ejection tray 13.

As described above, a series of image forming operations (i.e., the printing operations) in the image forming apparatus 100 and a series of sheet separating operation of the two-ply sheet PJ and the sheet laminating operation of the inner sheet PM on which the image is formed are completed.

The operation in the sheet lamination mode has been described above, but the operation in the regular print mode is substantially same as the operation in the sheet lamination mode, except that the operation performed in the sheet laminator 50 is not performed on the sheet P in the regular print mode.

Figure 2:
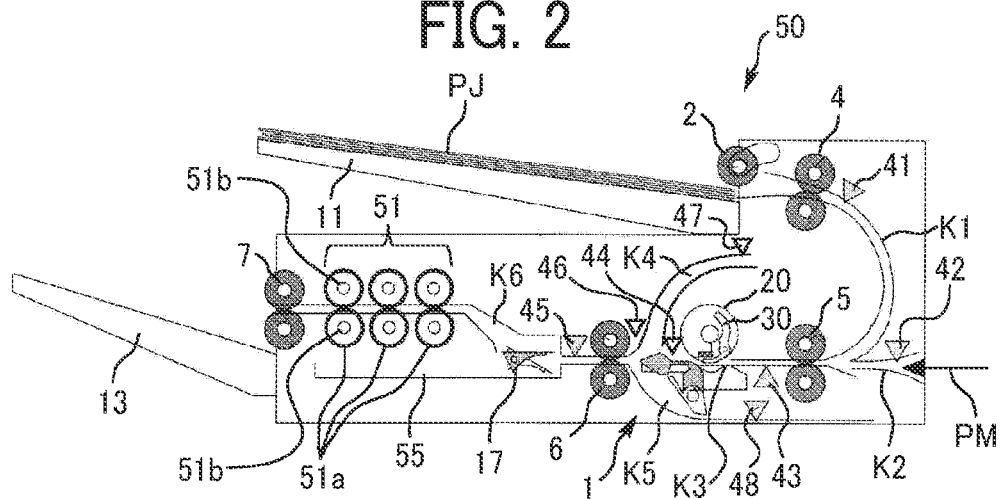
FIG. 2 is a diagram illustrating a sheet laminator included in the image forming system of FIG. 1.

A description is given of an overall configuration and operations of a sheet laminator 50 according to an embodiment of this disclosure, with reference to FIG. 2.

FIG. 2 is a diagram illustrating the sheet laminator 50 included in the image forming apparatus 100.

The sheet laminator 50 includes the unit sheet tray 11 that functions as a first sheet feeder, the sheet separation device 1, the sheet lamination device 51, the ejection tray 13 serving as an ejection unit, and a second ejection tray 55.

The sheet separation device 1 separates the non-bonding portion of a two-ply sheet PJ in which two sheets, which are a first sheet P1 and a second sheet P2, are overlapped and bonded together at one end of the two-ply sheet PJ as a bonding portion A of the two-ply sheet PJ (see FIGS. 12A to 12E and other drawings).

In particular, in the present embodiment, the two-ply sheet PJ is made of the first sheet P1 and the second sheet P2 overlapped and bonded together at one side of the four sides as the bonding portion A. In other words, in the two-ply sheet PJ including the first sheet P1 and the second sheet P2, one side (the bonding portion A) of the first sheet P1 and one side (the bonding portion A) of the second sheet P2 are bonded (attached) by, e.g., thermal welding, and the other side of the first sheet P1 and the other side of the second sheet P2 are not bonded (attached). As the first sheet P1 and the second sheet P2 of the two-ply sheet PJ, a transparent film sheet (that is, a laminated sheet) may be employed.

The sheet separation device 1 separates the first sheet P1 and the second sheet P2 constructing the two-ply sheet PJ, in other words, separates the other side of the two sheets that is opposite the bonding portion A that maintains bonding of the first sheet P1 and the second sheet P2. Subsequently, the sheet separation device 1 inserts an inner sheet PM between the separated two sheets, which are the first sheet P1 and the second sheet P2 constructing the two-ply sheet PJ. The inner sheet PM is a sheet including at least one plain sheet or a photograph.

As illustrated in FIG. 2, the sheet laminator 50 includes the unit sheet tray 11, a sheet feed roller 2, a first conveyance roller pair 4, a second conveyance roller pair 5, a third conveyance roller pair 6, the ejection tray 13, the second ejection tray 55, the sheet lamination device 51, a first sensor 41, a second sensor 42, a third sensor 43, a fourth sensor 44, a fifth sensor 45, a sixth sensor 46, a seventh sensor 47, an eighth sensor 48, the winding roller 20, the moving mechanism 30, and separation claws 16 each functioning as a separator (see FIGS. 8A to 8C and 12A to 12E).

The sheet laminator 50 further includes a plurality of sheet conveyance passages such as a first sheet conveyance passage K1, a second sheet conveyance passage K2, a third sheet conveyance passage K3, a first branched sheet conveyance passage K4, a second branched sheet conveyance passage K5, and a fourth sheet conveyance passage K6.

Each of the first sheet conveyance passage K1, the second sheet conveyance passage K2, the third sheet conveyance passage K3, the first branched sheet conveyance passage K4, the second branched sheet conveyance passage K5, and the fourth sheet conveyance passage K6 includes two conveyance guides (guide plates) facing each other to guide and convey the sheet such as the two-ply sheet PJ and the inner sheet PM.

More specifically, the two-ply sheet PJ is loaded on the unit sheet tray 11. The sheet feed roller 2 feeds the uppermost two-ply sheet PJ on the unit sheet tray 11, to the first conveyance roller pair 4, and the first conveyance roller pair 4 conveys the two-ply sheet PJ along the first sheet conveyance passage K1.

Each of the unit sheet tray 11 and the sheet feed roller 2 functions as a first sheet feeder to feed the two-ply sheet PJ. The first sheet feeder is controlled by the controller 200 (see FIG. 5). To be more specific, the controller 200 drives and rotates the sheet feed roller 2 to feed the two-ply sheet PJ from the unit sheet tray 11. Details of the controller 200 are be described below.

Then, in the image forming apparatus 100 according to the present embodiment, the controller 200 causes the apparatus sheet tray 112 and the sheet feed roller 197 (each functioning as a second sheet feeder) to start feeding the inner sheet PM after the unit sheet tray 11 and the sheet feed roller 2 (each functioning as a first sheet feeder) feeds the two-ply sheet PJ and before the operation to separate the non-bonding portion of the two-ply sheet PJ is completed.

In other words, in the present embodiment, the feeding of the two-ply sheet PJ and the feeding of the inner sheet PM are not performed separately (instructed by a user via the operation display panel 49) but can be performed in a single operation. To be more specific, as a user presses the button on the operation display panel 49 once to start the operation, the sheet separating operation in which the two-ply sheet PJ is fed and separated and the sheet inserting operation in which the inner sheet PM is inserted into the two-ply sheet PJ between the first sheet P1 and the second sheet P2 separated from each other are collectively performed automatically based on the single instruction.

The operation to start feeding the inner sheet PM from the apparatus sheet tray 112 is performed not after completion of the sheet separating operation of the two-ply sheet PJ but performed before completion of the sheet separating operation of the two-ply sheet PJ. Due to such a configuration, the time to be taken for a series of steps from when the two-ply sheet PJ is fed from the unit sheet tray 11 to when the inner sheet PM is completely inserted in the two-ply sheet PJ is reduced efficiently, and therefore the productivity of the image forming apparatus 100 and the sheet laminator 50 is enhanced. In other words, the time to be taken for the sheet lamination mode is reduced.

Each of the first conveyance roller pair 4, the second conveyance roller pair 5, the third conveyance roller pair 6, and the ejection roller pair 7 includes a drive roller and a driven roller, and conveys the sheet nipped by the respective nip regions. The third sheet conveyance passage K3 includes the second conveyance roller pair 5, the winding roller 20, and the third conveyance roller pair 6, from the upstream side in the sheet conveyance direction. In particular, the winding roller 20 and the third conveyance roller pair 6 are configured to be rotatable in a forward direction or in a reverse direction. The third conveyance roller pair 6 conveys the sheet in the forward direction that is the left direction in FIG. 2 and in the reverse direction that is the right direction in FIG. 2. The third conveyance roller pair 6 also functions as a sheet conveying roller pair that conveys the sheet to the sheet lamination device 51 or to the second ejection tray 55. The ejection roller pair 7 functions as a sheet conveying roller pair that conveys and ejects the two-ply sheet PJ (and the inner sheet PM) after the sheet laminating operation, toward the ejection tray 13.

A switching claw 17 is disposed downstream from the third conveyance roller pair 6 in the forward direction (sheet conveyance direction to the left in FIG. 2). The switching claw 17 switches the direction of conveyance of the sheet P, for example, by conveying the sheet P toward the sheet lamination device 51 or toward the second ejection tray 55. The switching claw 17 is controlled according to the mode selected by a user, so as to switch the direction of conveyance (ejection) of the sheet P.

Each of the first sensor 41, the second sensor 42, the third sensor 43, the fourth sensor 44, and the fifth sensor 45 functions as a sheet detector employing a reflective photosensor that optically detects whether the sheet is present at the position of each sensor. The first sensor 41 is disposed near a portion downstream from the first conveyance roller pair 4 in the sheet conveyance direction. The second sensor 42 is disposed near a portion downstream from the ejection roller pair 131 (see FIG. 1) in the sheet conveyance direction. The third sensor 43 is disposed near a portion downstream from the second conveyance roller pair 5 in the sheet conveyance direction. The fourth sensor 44 is disposed near a portion downstream from the winding roller 20 (at the left side of the winding roller 20 in FIG. 2) and upstream from the third conveyance roller pair 6 (at the right side of the third conveyance roller pair 6 in FIG. 2) in the sheet conveyance direction. The fifth sensor 45 is disposed near a portion downstream from the third conveyance roller pair 6 (at the left side of the third conveyance roller pair 6 in FIG. 2) in the sheet conveyance direction.

A description is given of the winding roller 20, with reference to FIGS. 3A, 3B, 4A, 4B, 7B, 7B', 7C, 7C', 7D, and 8A.

Figure 3A:
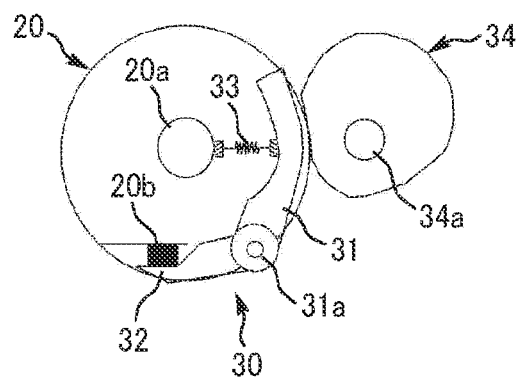
FIG. 3A is a side view of a gripper that has moved to a gripping position in a sheet separation device included in the sheet laminator illustrated in FIG. 2.

FIG. 3A is a side view of a gripper that has moved to a gripping position in the sheet separation device 1 included in the sheet laminator 50.

Figure 3B:
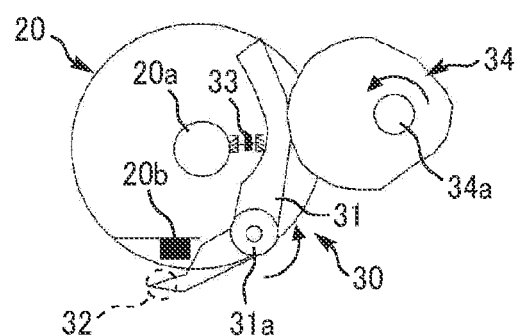
FIG. 3B is a side view of the gripper that has moved to a releasing position in the sheet separation device included in the sheet laminator illustrated in FIG. 2.

FIG. 3B is a side view of the gripper that has moved to a releasing position in the sheet separation device 1 included in the sheet laminator 50.

Figure 4A:
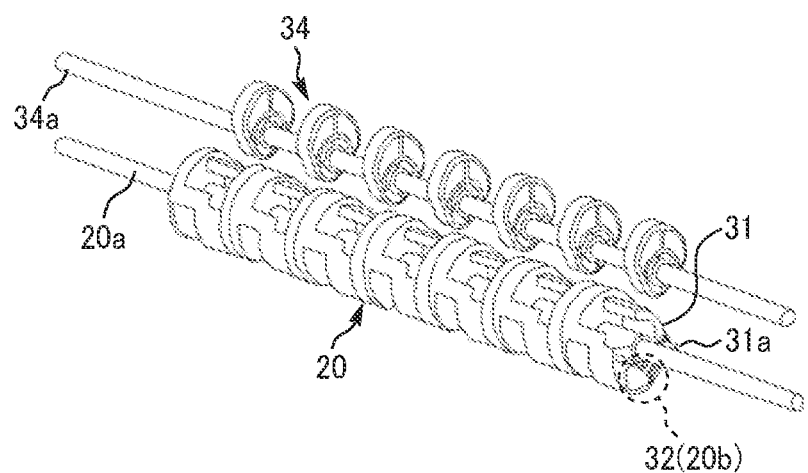
FIG. 4A is a perspective view of the gripper that has moved to the gripping position in the sheet separation device included in the sheet laminator illustrated in FIG. 2.

FIG. 4A is a perspective view of the gripper that has moved to the gripping position in the sheet separation device 1 included in the sheet laminator 50.

Figure 4B:
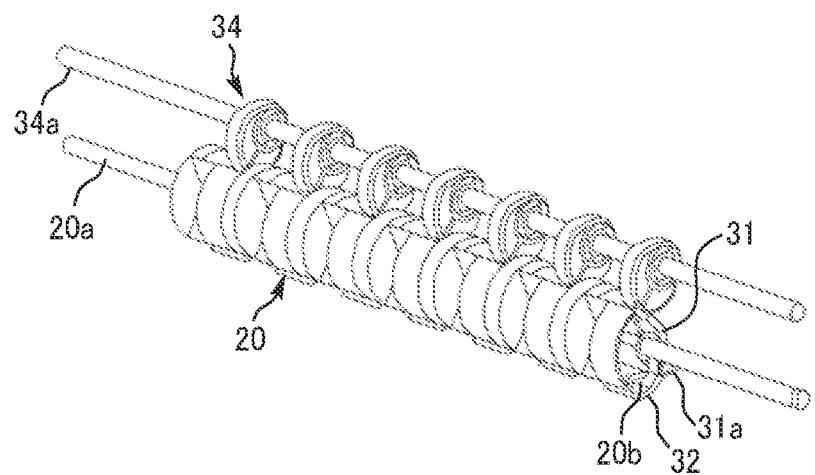
FIG. 4B is a perspective view of the gripper that has moved to the releasing position in the sheet separation device included in the sheet laminator illustrated in FIG. 2.

FIG. 4B is a perspective view of the gripper that has moved to the releasing position in the sheet separation device 1 included in the sheet laminator 50.

Figure 5:
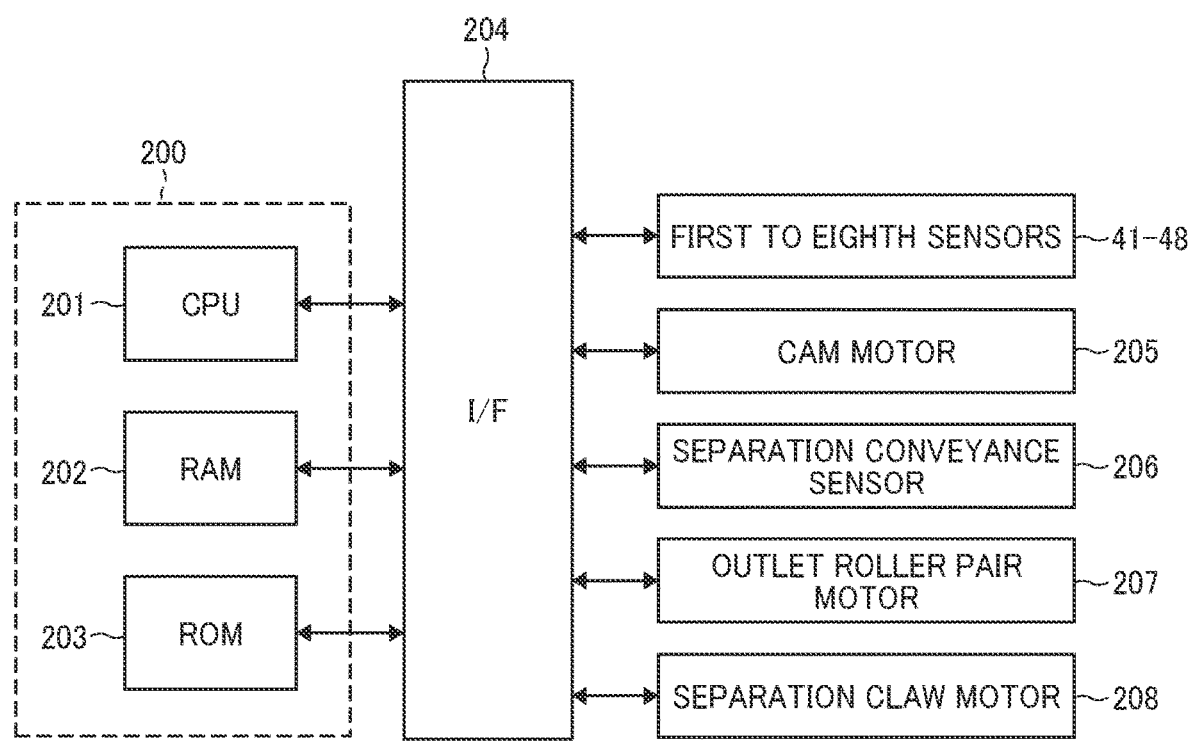
FIG. 5 is a block diagram illustrating a hardware configuration of a control system of a sheet laminator according to an embodiment of the present disclosure.

FIG. 5 is a block diagram illustrating a hardware configuration of a control system of the sheet laminator 50.

FIGS. 6A, 6B, 6C, and 6D are schematic views of the sheet separation device 1, each illustrating the sheet separating operation performed in the sheet separation device 1.

FIGS. 7A, 7B, 7C, and 7D are schematic views of the sheet separation device 1, each illustrating the sheet separating operation performed in the sheet separation device 1 subsequent from the sheet separating operation of FIGS. 6A, 6B, 6C, and 6D.

Figure 7A:
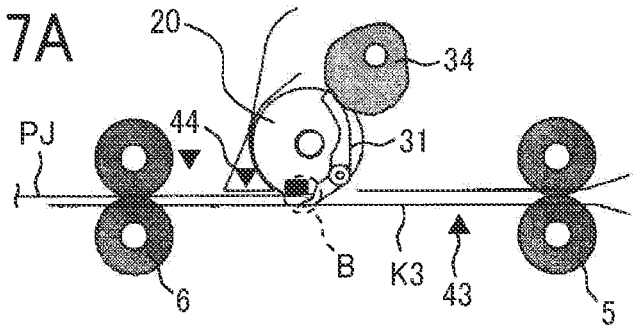
FIGS. 7A, 7B, 7C, and 7D are schematic views of the sheet separation device, each illustrating the sheet separating operation performed in the sheet separation device, subsequent from the sheet separating operation of FIGS. 6A, 6B, 6C, and 6D.
Figure 7B:
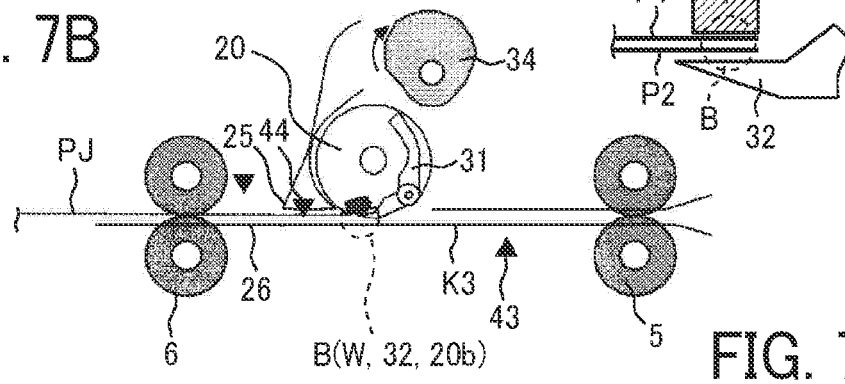
Figure 7C:
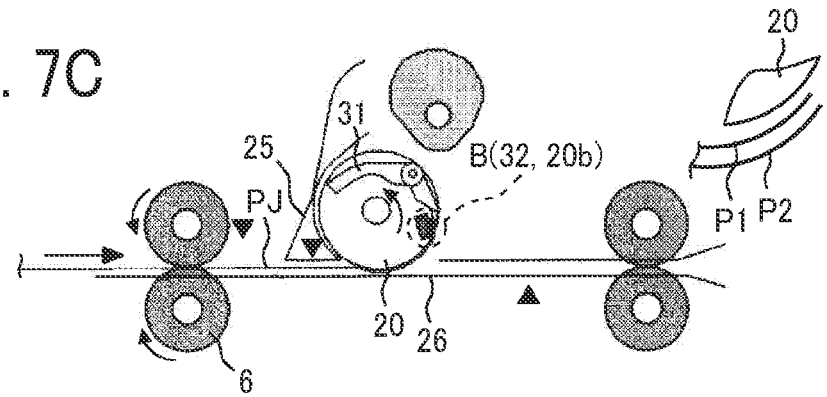
Figure 7D:
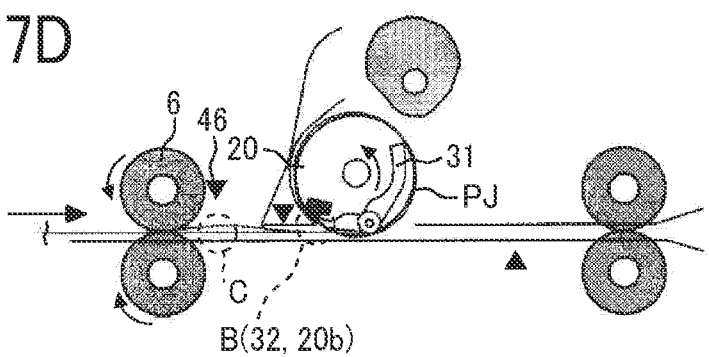
Figure 8A:
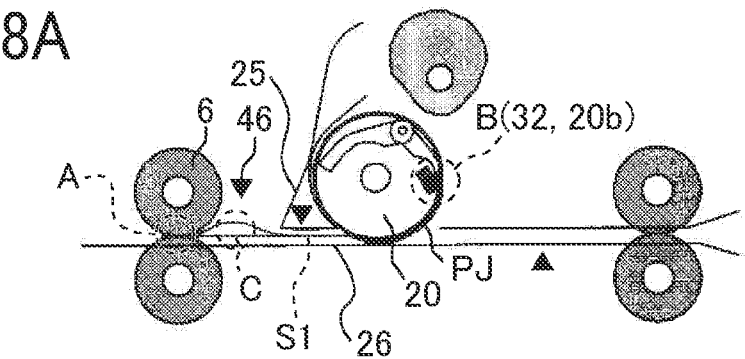
FIGS. 8A, 8B, and 8C are schematic views of the sheet separation device, each illustrating the sheet separating operation performed in the sheet separation device, subsequent from the sheet separating operation of FIGS. 7A, 7B, 7C, and 7D.
Figure 8B:
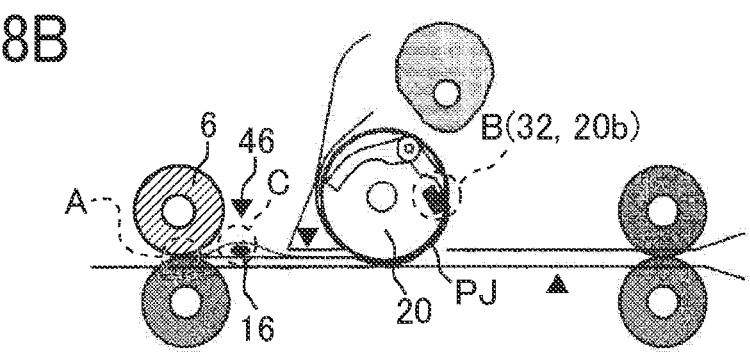
Figure 8C:
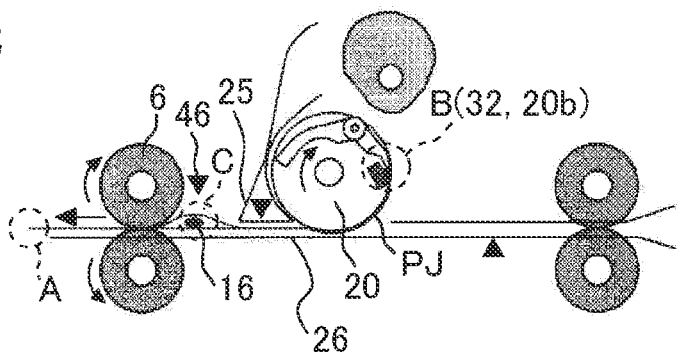

FIGS. 8A, 8B, and 8C are schematic views of the sheet separation device 1, each illustrating the sheet separating operation performed in the sheet separation device 1, subsequent from the sheet separating operation of FIGS. 7A, 7B, 7C, and 7D.

The winding roller 20 is a roller that winds the two-ply sheet PJ, with a gripper 32 that functions as a gripper (handle) gripping a gripped portion B of the two-ply sheet PJ at a winding start position W (see FIG. 7B). The gripped portion B is an end of the two-ply sheet PJ that is opposite an end at which the bonding portion A is formed, which is referred to as the other end of the two-ply sheet PJ. While the gripper 32 grips the gripped portion B of the two-ply sheet PJ, the winding roller 20 rotates in a given rotation direction (that is, the counterclockwise direction in FIGS. 7A, 7B, 7B', 7C, 7C', and 7D) to wind the two-ply sheet PJ around the winding roller 20. The winding roller 20 is rotatable around a rotary shaft 20a in the forward direction and in the reverse direction. The controller 200 controls a drive motor that drives the winding roller 20.

More specifically, the two-ply sheet PJ starts from the unit sheet tray 11 and passes through the first sheet conveyance passage K1, and the second conveyance roller pair 5 conveys the two-ply sheet PJ in the forward direction along the third sheet conveyance passage K3. The two-ply sheet PJ passes through the winding start position W of the winding roller 20 temporarily and is conveyed to a position of the third conveyance roller pair 6 that is a position at which the trailing end of the two-ply sheet PJ passes through the fourth sensor 44 but does not pass through the third conveyance roller pair 6, that is, the position before the third conveyance roller pair 6. Then, the third conveyance roller pair 6 rotates in the reverse direction to convey the two-ply sheet PJ in the reverse direction to the position of the winding roller 20 that is the winding start position W, and the gripper 32 grips the other end (leading end) of the two-ply sheet PJ. The two-ply sheet PJ is further conveyed while the other end (leading end) of the two-ply sheet PJ is gripped by the gripper 32, and the winding roller 20 rotates in the counterclockwise direction in FIG. 2 to wind the two-ply sheet PJ around the winding roller 20.

With reference to FIG. 7C', as the winding roller 20 winds the two-ply sheet PJ, the length of a sheet wound around the winding roller 20 is proportional to the diameter of the winding roller 20. For this reason, the first sheet P1 is on the inner side to the center of the winding roller 20, that is, closer to the inner circumferential face of the winding roller 20, than the second sheet P2 on the outer side to the center of the winding roller 20, that is, closer to the outer circumferential face of the winding roller 20, and the length of the first sheet P1 wound around the winding roller 20 is shorter than the length of the second sheet P2 wound around the winding roller 20. As a result, misalignment occurs in a part of the two-ply sheet PJ in which the sheet P1 is in close contact with the sheet P2 (in other words, the part in which the sheet P1 sticks to the sheet P2) other than the bonding portion A and the gripped portion B. The misalignment causes the first sheet P1 to slack and bend toward the second sheet P2, forming a gap C between the two sheets, which are the first sheet P1 and the second sheet P2, in the vicinity of the bonding portion A of the two-ply sheet PJ, as illustrated in FIGS. 7D and 8A. In other words, when the first sheet P1 that is placed on the second sheet P2 is warped upward, the gap C is formed between the first sheet P1 and the second sheet P2 at one end of the two-ply sheet PJ, that is, the upstream side in the sheet conveyance direction when the two-ply sheet PJ is conveyed in the right direction in FIG. 1.

As described above, the first sheet P1 and the second sheet P2 that are in close contact with each other without any gap are separated from each other.

Particularly in the present embodiment, in order to significantly form the gap C as described above, in other words, in order to increase the difference between the length of the first sheet P1 wound around the winding roller 20 and the length of the second sheet P2 wound around the winding roller 20, the two-ply sheet PJ is wound around the winding roller at least one round.

As described above, in the present embodiment, by providing the winding roller 20 to wind the two-ply sheet PJ around the rotary shaft 20a, the two-ply sheet PJ is separatable without increasing the size and cost of the sheet laminator 50.

As illustrated in FIG. 7B', the gripper 32 in the present embodiment grips the gripped portion B of the two-ply sheet PJ without contacting the end face of the other end of the gripped portion B of the two-ply sheet PJ.

More specifically, the gripper 32 nips and grips the gripped portion B of the two-ply sheet PJ between the gripper 32 and a receiving portion 20b of the winding roller 20 without causing any member to contact the end face of the other end of the two-ply sheet PJ, in other words, without causing any member to hit or contact the end face of the two-ply sheet PJ. The receiving portion 20b of the winding roller 20 is a part of the outer circumferential portion of the winding roller 20 and is arranged to be exposed outwardly and facing the gripper 32.

More specifically, the two-ply sheet PJ is not nipped and gripped by the gripper 32 and the receiving portion 20b of the winding roller 20 when a specific member such as the gripper 32 contacts the end face of the other end (that is the leading end face). The two-ply sheet PJ is nipped and gripped by the gripper 32 and the receiving portion 20b while the end face of the other end (leading end face) does not contact any member. At this time, the gripper 32 is located close to the second sheet P2 on the outer side to the center of the winding roller 20 and the receiving portion 20b is located close to the first sheet P1 on the inner side to the center of the winding roller 20.

Accordingly, when compared with a configuration in which the leading end face of the two-ply sheet PJ contacts a member, the above-described structure according to the present embodiment can reduce damage on the two-ply sheet PJ (particularly, the leading end). In particular, once the leading end face of the two-ply sheet PJ is damaged, it is difficult to perform the sheet laminating operation on the damaged leading end face. For this reason, the configuration of the present disclosure is useful.

In the present embodiment, the bonding portion A of the two-ply sheet PJ wound around the winding roller 20 is the one end of the two-ply sheet PJ. The one end is opposite to the other end functioning as the gripped portion B.

In the present embodiment, at least the gripper 32 (handle) or the receiving portion 20b is made of elastic material such as rubber.

According to this configuration, when compared with a sheet separation device having a configuration in which the gripper 32 and the receiving portion 20b have rigid bodies made of metal or resin, the above-described sheet separation device 1 according to the present embodiment enhances the gripping force to grip the two-ply sheet PJ and prevents the surfaces of the two-ply sheet PJ from being damaged. In particular, the sheet separation device 1 including the gripper 32 and the receiving portion 20b made of the elastic material easily exhibits the above-described effect.

As illustrated in FIGS. 3A, 3B, 4A, and 4B, the moving mechanism 30 moves the gripper 32 between a gripping position (e.g., the position illustrated in FIGS. 3A and 4A) at which the gripper 32 grips the two-ply sheet PJ and a releasing position (e.g., the position illustrated in FIGS. 3B and 4B) at which the gripper 32 is released from the gripping position.

Specifically, the moving mechanism 30 includes an arm 31, a compression spring 33, a cam 34, and a cam motor 205 (see FIG. 5). The compression spring 33 functions as a biasing member. The cam motor 205 drives to rotate the cam 34 in the forward direction or the reverse direction.

The arm 31 holds the gripper 32. The arm 31 and the gripper 32 are held together by the winding roller 20 to be rotatable together around a support shaft 31a. In the present embodiment, the gripper 32 is coupled to the tip of the arm 31, and the gripper 32 and the arm 31 are made (held) as a single unit. Alternatively, the gripper 32 and the arm 31 may be made as separate members, and the gripper 32 may be disposed on the arm 31, that is, may be held by the arm 31. In any case, the arm 31 holding the gripper 32 rotates around the rotary shaft 20a together with the winding roller 20.

The compression spring 33 functions as a biasing member that biases the arm 31 so that the gripper 32 moves from the releasing position illustrated in FIG. 3B to the gripping position illustrated in FIG. 3A. To be more specific, one end of the compression spring 33 is coupled to a fixed position near the rotary shaft 20a, and the other end of the compression spring 33 is coupled to one end of the arm 31 that is an end opposite to the other end of the arm 31 coupled to the gripper 32 with respect to the support shaft 31a.

The cam 34 pushes the arm 31 against the biasing force of the compression spring 33 that functions as the biasing member, so that the gripper 32 moves from the gripping position illustrated in FIG. 3A to the releasing position illustrated in FIG. 3B. The cam motor 205 that is controlled by the controller 200 drives the cam 34 to rotate in the forward direction or the reverse direction at a desired rotation angle. The cam 34 is held by the housing of the sheet laminator 50 so as to be rotatable around a cam shaft 34a separately from the winding roller 20.

In the moving mechanism 30 having the configuration as described above, as illustrated in FIGS. 3A and 4A, while the cam 34 is not in contact with the arm 31, the arm 31 is biased by the compression spring 33 to press the gripper 32 against the receiving portion 20b. This state is referred to as a closed state. In the closed state, the gripper 32 and the receiving portion 20b grip the two-ply sheet PJ.

By contrast, as illustrated in FIGS. 3B and 4B, while the cam 34 is contacts and presses the arm 31, the arm 31 rotates in the counterclockwise direction in FIG. 3B about the support shaft 31a against the biasing force of the compression spring 33, so that the gripper 32 separates from the receiving portion 20b. This state is referred to as an open state. In the open state, the two-ply sheet PJ is not gripped, which is referred to as a grip release state.

In the present embodiment, as illustrated in FIGS. 4A and 4B, the winding roller 20 includes a plurality of roller portions (i.e., seven roller portions in the present embodiment) separated in the axial direction of the winding roller 20. Similarly, the cam 34 includes a plurality of cam portions separated in the axial direction of the cam 34 so that the divided positions of the plurality of cam portions of the cam 34 respectively meet and face the plurality of roller portions of the winding roller 20.

Setting portions provided at given intervals in the axial direction to grip the two-ply sheet PJ as described above, that is, not setting the entire area of the winding roller 20 and the cam 34 in the axial direction to grip the two-ply sheet PJ share load for gripping the two-ply sheet PJ. The above-described configuration is useful when a gripping force for gripping the two-play sheet PJ increases.

A description is given of the control system of the sheet laminator 50, with reference to FIG. 5.

As illustrated in FIG. 5, the sheet laminator 50 has the control system including a central processing unit (CPU) 201, and a random access memory (RAM) 202, a read-only memory (ROM) 203, and an interface (I/F) 204. The CPU 201, the RAM 202, are the ROM 203 are connected via the I/F 204.

The CPU 201 is a calculation unit and controls the operation of the entire sheet laminator 50. The RAM 202 is a volatile storage medium that allows data to be read and written at high speed. The CPU 201 uses the RAM 202 as a work area for data processing. The ROM 203 is a read-only non-volatile storage medium that stores programs such as firmware.

The sheet laminator 50 processes, by an arithmetic function of the CPU 201, e.g., a control program stored in the ROM 203 and an information processing program (or application program) loaded into the RAM 202. Such processing configures a software controller including various functional modules of the sheet laminator 50. The software controller thus configured cooperates with hardware resources of the sheet laminator 50 to construct functional blocks to implement functions of the sheet laminator 50. In other words, the CPU 201, the RAM 202, and the ROM 203 constitute the controller 200 to control the operation of the sheet laminator 50.

The I/F 204 is an interface that connects the cam motor 205, a separation conveyance motor 206, an outlet roller pair motor 207, a separation claw motor 208, the first sensor 41, the second sensor 42, the third sensor 43, the fourth sensor 44, the fifth sensor 45, the sixth sensor 46, the seventh sensor 47, and the eighth sensor 48, to the controller 200. The controller 200 causes respective drive devices to drive the cam motor 205, the separation conveyance motor 206, the outlet roller pair motor 207, and the separation claw motor 208, via the I/F 204.

The cam motor 205 is a drive device to drive the cam 34. The separation conveyance motor 206 is a drive device to drive the winding roller 20. The outlet roller pair motor 207 is a drive device to drive the third conveyance roller pair 6. The separation claw motor 208 is a drive device to drive the separation claws 16.

Figure 6A:
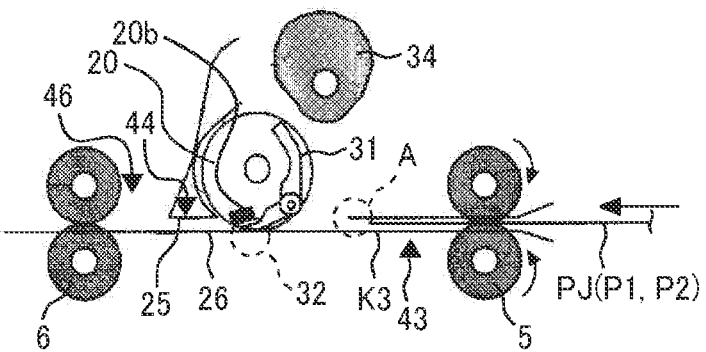
FIGS. 6A, 6B, 6C, and 6D are schematic views of the sheet separation device, each illustrating the sheet separating operation performed in the sheet separation device.
Figure 6B:
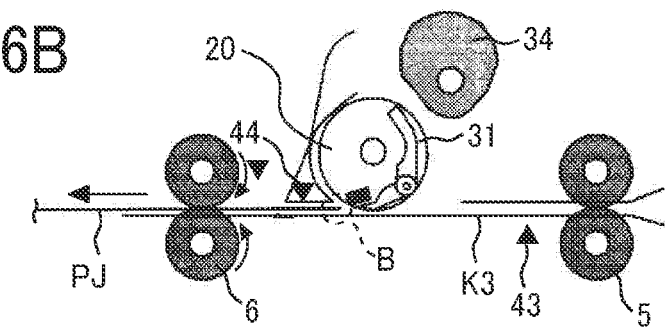
Figure 6C:
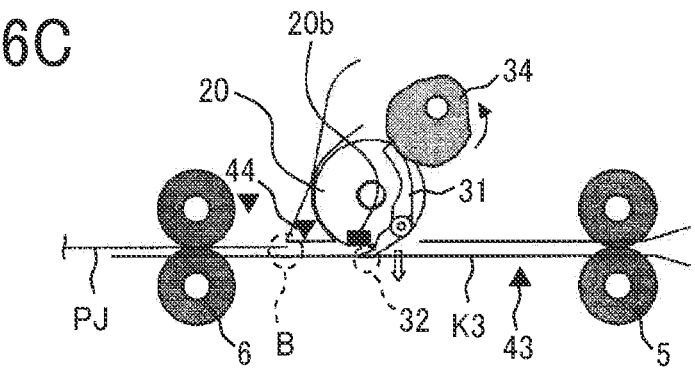
Figure 6D:
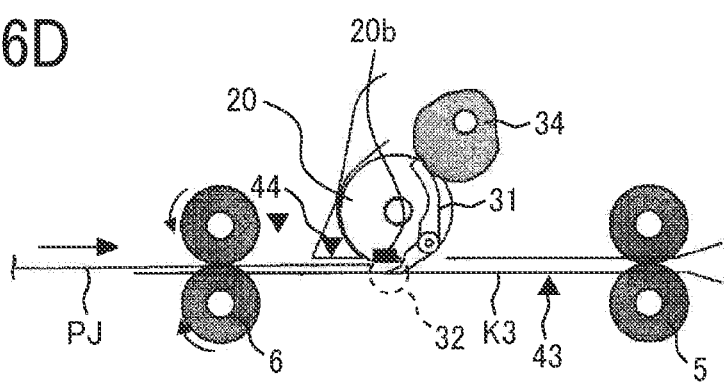

A description is given of the fourth sensor 44 in the sheet laminator 50 according to the present embodiment, with reference to FIGS. 2, 6D, and 7A.

The fourth sensor 44 functions as a sheet detection sensor to detect the two-ply sheet PJ conveyed between the winding roller 20 and the third conveyance roller pair 6. The fourth sensor 44 detects the leading end of the two-ply sheet PJ conveyed by the third conveyance roller pair 6 toward the winding roller 20 in the sheet conveyance direction. Based on the detection results detected by the fourth sensor 44, the controller 200 controls the moving mechanism 30.

More specifically, the fourth sensor 44 is disposed in the sheet conveyance passage between the winding roller 20 and the third conveyance roller pair 6. As illustrated in FIGS. 6D and 7A, when the third conveyance roller pair 6 conveys the two-ply sheet PJ in the reverse direction toward the position of the winding roller 20 with the gripped portion B of the two-ply sheet PJ acting as the leading end, the fourth sensor 44 detects the leading end (that is, the leading end of the gripped portion B) of the two-ply sheet PJ conveyed in the reverse direction. In response to the detection timing at which the fourth sensor 44 detects the leading end (in the reverse direction) of one end of the gripped portion B, the controller 200 adjusts and controls the timing to stop the two-ply sheet PJ at the gripping position and the timing at which the gripper 32 grips the gripped portion B. To be more specific, after a predetermined time has passed since the fourth sensor 44 detected the leading end of the two-ply sheet PJ, the third conveyance roller pair 6 stops conveyance of the two-ply sheet PJ in the reverse direction, and the cam 34 rotates to pivot the arm 31 of the moving mechanism 30 so that the gripper 32 moves from the releasing position illustrated in FIG. 3B to the gripping position illustrated in FIG. 3A.

The above-described control accurately performs an operation in which the end face of the two-ply sheet PJ is nipped by the gripper 32 and the receiving portion 20b without contacting the end face of the two-ply sheet PJ on any member.

As described above, the third conveyance roller pair 6 is a sheet conveying roller pair that conveys the two-ply sheet PJ with the other end (the opposite end opposite the one end of the two-ply sheet PJ, i.e., the gripped portion B) as a leading end, toward the winding start position W of the winding roller 20 in the third sheet conveyance passage K3 (sheet conveyance passage) between the third conveyance roller pair 6 and the winding roller 20.

A description is given of the separation claws 16, each functioning as a separator, with reference to FIGS. 8A to 8C, 11, 12A to 12E, and 16.

Figure 11:
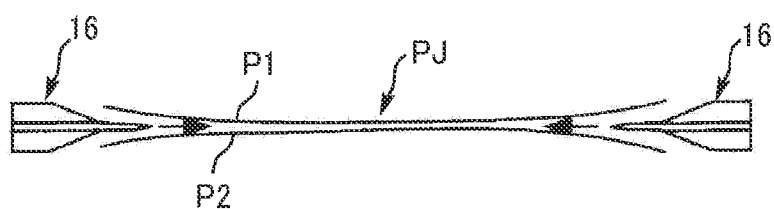
FIG. 11 is a schematic view of separation claws inserted into a two-ply sheet in a width direction of the two-ply sheet.

FIG. 11 is a schematic view of separation claws 16 inserted into the two-ply sheet PJ in a width direction of the two-ply sheet PJ.

FIGS. 12A, 12B, 12C, 12D, and 12E are perspective views, each illustrating the operation of the separation claws 16.

Figure 16:
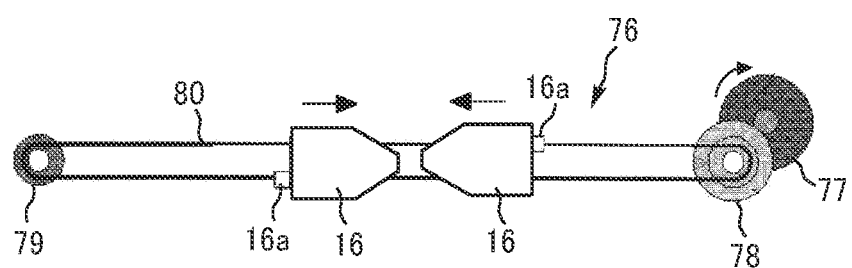
FIG. 16 is a schematic view of a moving mechanism to move the separation claws.

FIG. 16 is a schematic view of the moving mechanism 30 to move the separation claws 16.

Figure 12A:
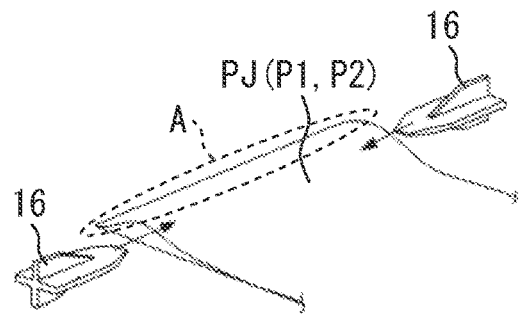
FIGS. 12A, 12B, 12C, 12D, and 12E are perspective views, each illustrating the operation of the separation claws.

Each of the separation claws 16 is a claw-shaped member that moves from the standby position illustrated in FIG. 12A and is inserted into the gap C formed between the first sheet P1 and the second sheet P2 of the two-ply sheet PJ at a given position of the two-ply sheet PJ.

More specifically, the separation claws 16 are inserted into the gap C formed between the first sheet P1 and the second sheet P2 at a position between the winding roller 20 and the third conveyance roller pair 6 from the standby positions outside both ends of the two-ply sheet PJ in the width direction of the two-ply sheet PJ, with respect to the two-ply sheet PJ when the other end (that is the gripped portion B) is wound by the winding roller 20 and the one end (that is the bonding portion A) is nipped by the third conveyance roller pair 6.

More specifically, in the present embodiment, the separation claws 16 are a pair of separation claws that functions as a pair of separators disposed at both sides of the two-ply sheet PJ in the width direction that is the direction perpendicular to a plane on which FIGS. 8A to 8C are illustrated and the horizontal direction in FIGS. 11 and 16. As illustrated in FIGS. 12A to 12E, the vertical length of each of the separation claws 16 in the vertical direction (thickness direction) of the two-ply sheet PJ gradually increases from the front end of each of the separation claws 16 near the center in the width direction of the two-ply sheet PJ, to the rear end of each of the separation claws 16 near the outsides in the width direction of the two-ply sheet PJ. Further, the separation claws 16 are movable in the width direction of the two-ply sheet PJ by a driving device 76 (see FIG. 16) controlled by the controller 200.

Figure 12B:
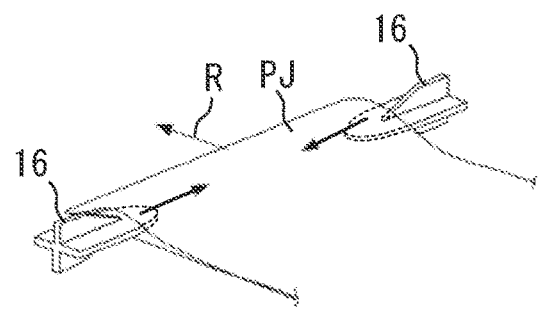

The separation claws 16 having the configuration as described above ordinarily stand by at respective standby positions at which the separation claws 16 do not interfere with conveyance of the sheet such as the two-ply sheet PJ in the third sheet conveyance passage K3. As illustrated in FIG. 12A, the standby positions of the separation claws 16 are outside of the two-ply sheet PJ (including the first sheet P1 and the second sheet P2) in the width direction of the two-ply sheet PJ. Subsequently, as illustrated in FIGS. 11 and 12B, the separation claws 16 enter the gap C in the two-ply sheet PJ when separating the two-ply sheet PJ (including the first sheet P1 and the second sheet P2). As a result, the separation claws 16 give the gap C to be relatively large.

As illustrated in FIG. 16, the driving device 76 that moves the pair of separation claws 16 in the width direction includes a motor 77, a gear pulley 78, a pulley 79, and a timing belt 80. The gear pulley 78 has a step-like ring shape including a gear and a pulley. The gear meshes with the motor gear mounted on the motor shaft of the motor 77. The pulley stretches and supports the timing belt 80 together with the pulley 79. One separation claw 16 of the pair of separation claws 16 includes a fixed portion 16a that is fixed to a part of the belt surface of the timing belt 80 that is the upper side of the belt surface in FIG. 16. The other separation claw 16 includes a fixed portion 16a that is fixed to a part of the other belt surface of the timing belt 80 that is the lower side of the belt surface in FIG. 16.

In the driving device 76 having the configuration as described above, the motor 77 drives to rotate the motor shaft in a direction indicated by arrow in FIG. 16 (i.e., clockwise direction), the gear pulley 78 rotates counterclockwise, the timing belt 80 rotates in the counterclockwise direction, and the pair of separation claws 16 moves from the outside in the width direction of the two-ply sheet PJ to the center in the width direction of the two-ply sheet PJ (in other words, the pair of separation claws 16 approaches each other). In contrast, when the motor 77 drives to rotate the motor shaft in the direction opposite to the arrow direction in FIG. 16, the pair of separation claws 16 moves from the center in the width direction of the two-ply sheet PJ toward the outside in the width direction of the two-ply sheet PJ (in other words, the pair of the separation claws 16 moves in a direction away from each other).

While the separation claws 16 are inserted into the gap C in the two-ply sheet PJ, the separation claws 16 relatively move (in a direction R) from the one end of the two-ply sheet PJ near the bonding portion A to the other end of the two-ply sheet PJ near the gripped portion B. Then, the separation claws 16 move in the width direction between the first sheet P1 and the second sheet P2 at the other end of the two-ply sheet PJ.

Figure 12C:
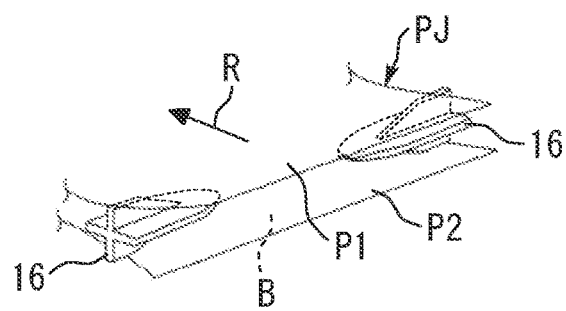
Figure 12D:
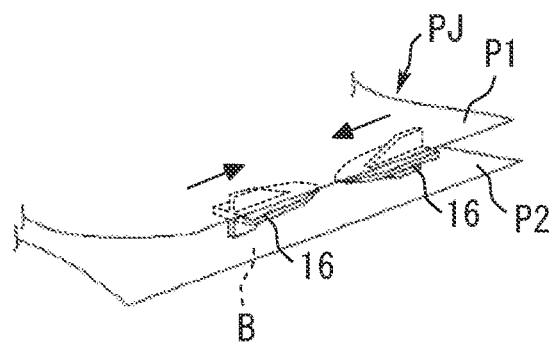

Specifically, the controller 200 controls the driving device 76 (see FIG. 16) to move the pair of separation claws 16 as follows. As illustrated in FIGS. 12B and 12C, the pair of separation claws 16 is inserted into both ends of the gap C in the two-ply sheet PJ in the width direction and relatively moves to the other end of the two-ply sheet PJ that is the gripped portion B. After the pair of separation claws 16 has relatively moved to the other end of the two-ply sheet PJ, as illustrated in FIG. 12D, the pair of separation claws 16 on the other end of the two-ply sheet PJ moves in the width direction from both ends of the two-ply sheet PJ to the center of the two-ply sheet PJ between the first sheet P1 and the second sheet P2. In order to cause the pair of separation claws 16 to move as described above, in the driving device 76, the pair of separation claws 16 can move from the standby positions to the positions at which the separation claws 16 come close to each other.

The above-described mechanism, which includes the winding roller 20 to wind the two-ply sheet PJ and the separation claws 16 to be inserted into the two-ply sheet PJ so as to separate the two-ply sheet PJ, reduces the size of the sheet separation device 1, when compared with a mechanism using a large-scale device such as a vacuum device to separate the two-ply sheet PJ. In other words, without increasing the size of the sheet laminator 50, the above-described mechanism preferably separates the first sheet P1 and the second sheet P2 of the two-ply sheet PJ.

In particular, since the separation claws 16 in the present embodiment move over substantially the entire area in the width direction of the two-ply sheet PJ on the other end of the two-ply sheet PJ (i.e., the trailing end of the two-ply sheet PJ), the separation claws 16 sufficiently separate (peel) the other ends of the first sheet P1 and the second sheet P2 of the two-ply sheet PJ, the other ends being opposite the bonding portion A. For this reason, it is less likely that the above-described configuration causes an inconvenience that the other end (that is opposite to the bonding portion A) of the two-ply sheet PJ is not sufficiently separated and that the inner sheet PM (see FIG. 12E) would not be inserted into the other end of the two-ply sheet PJ. Additionally, the above-described configuration allows the separation claws 16 to easily function as a switcher, in other words, to separately guide the first sheet P1 and the second sheet P2 to the first branched sheet conveyance passage K4 and the second branched sheet conveyance passage K5, respectively.

A description is given of the separation claws 16 each functioning as a switcher, with reference to FIGS. 9A to 12E.

Figure 9A:
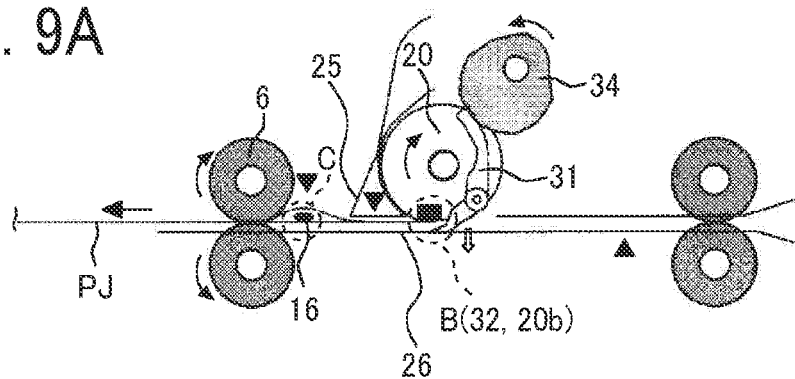
FIGS. 9A, 9B, and 9C are schematic views of the sheet separation device, each illustrating the sheet separating operation performed in the sheet separation device, subsequent from the sheet separating operation of FIGS. 8A, 8B, and 8C.
Figure 9B:
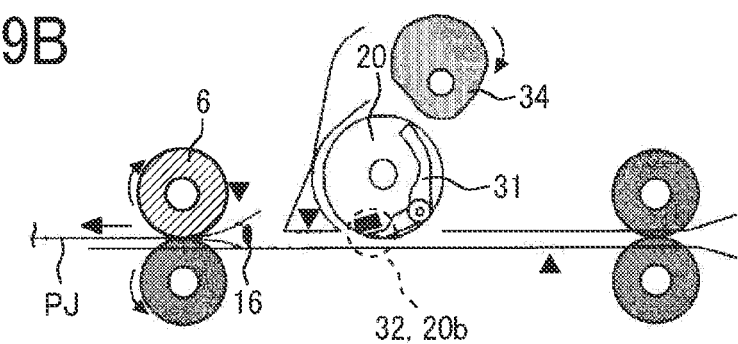
Figure 9C:
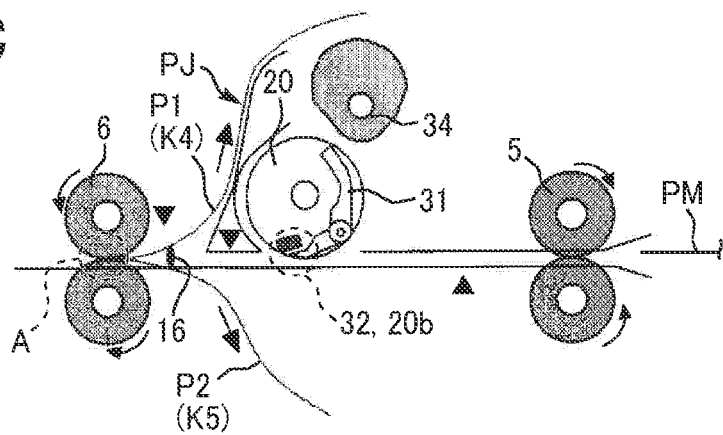

FIGS. 9A, 9B, and 9C are schematic views of the sheet separation device 1, each illustrating the sheet separating operation performed in the sheet separation device 1, subsequent from the sheet separating operation of FIGS. 8A, 8B, and 8C.

Figure 10A:
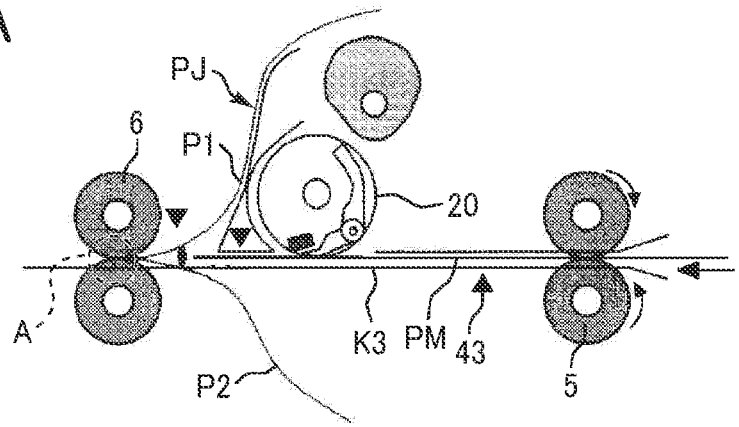
FIGS. 10A, 10B, and 10C are schematic views of the sheet separation device, each illustrating the sheet separating operation performed in the sheet separation device, subsequent from the sheet separating operation of FIGS. 9A, 9B, and 9C.
Figure 10B:
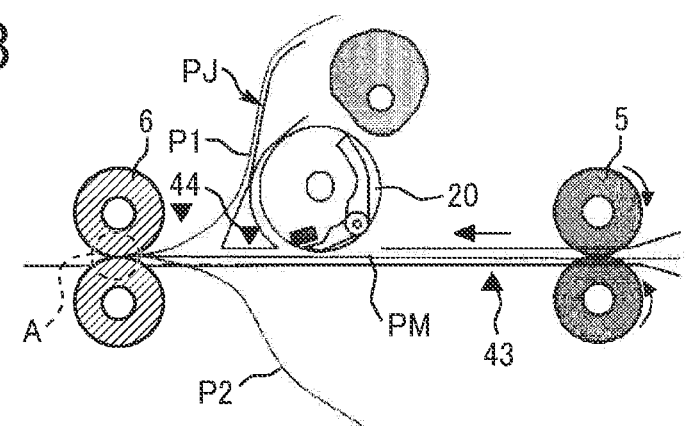
Figure 10C:
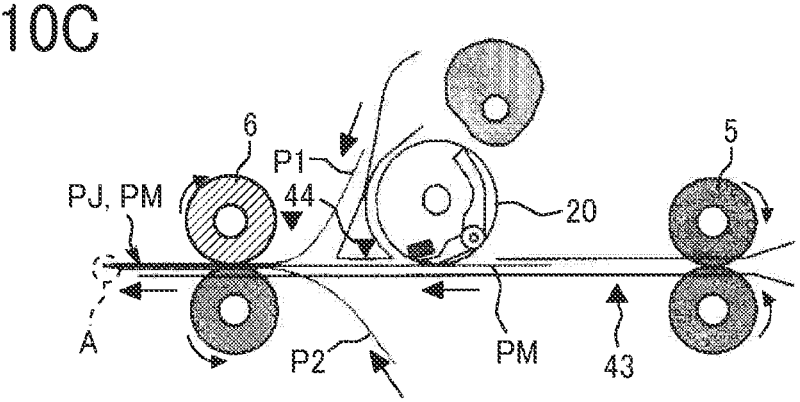

FIGS. 10A, 10B, and 10C are schematic views of the sheet separation device 1, each illustrating the sheet separating operation performed in the sheet separation device 1, subsequent from the sheet separating operation of FIGS. 9A, 9B, and 9C.

In the present embodiment, the separation claws 16 functioning as a separator also function as a switcher that guides the first sheet P1 and the second sheet P2 separated by the separation claws 16, to the first branched sheet conveyance passage K4 and the second branched sheet conveyance passage K5 branching off in different directions, respectively (see FIG. 9C).

More specifically, as illustrated in FIG. 9C, the first branched sheet conveyance passage K4 and the second branched sheet conveyance passage K5 branch off in different directions from the third sheet conveyance passage K3 between the winding roller 20 and each of the separation claws 16 (separator). To be more specific, the first branched sheet conveyance passage K4 branches upward from the third sheet conveyance passage K3, and the second branched sheet conveyance passage K5 branches downward from the third sheet conveyance passage K3.

As illustrated in FIGS. 9A to 9C, after the separation claws 16 are inserted into the gap C, the third conveyance roller pair 6 conveys the one end of the two-ply sheet PJ to the left side in FIGS. 9A to 9C so that the winding of the other end of the two-ply sheet PJ on the winding roller 20 is released (see FIG. 12A to FIG. 12C). After the winding of the other end of the two-ply sheet PJ on the winding roller 20 is released, the separation claws 16 move to the center in the width direction of the two-ply sheet PJ as illustrated in FIG. 12D, and stop at the center in the width direction of the two-ply sheet PJ. Then, while the separation claws 16 remain at the center in the width direction of the two-ply sheet PJ, the third conveyance roller pair 6 conveys the other end of the two-ply sheet PJ to the right side in FIGS. 9A to 9C again. Then, the separation claws 16 guide the first sheet Pb and the second sheet P2 separated by the separation claws 16, to the first branched sheet conveyance passage K4 and the second branched sheet conveyance passage K5, respectively. In other words, the controller 200 causes the separation claws 16 to guide the two sheets (i.e., the first sheet P1 and the second sheet P2) separated by the separation claws 16, to the two branched sheet conveyance passages (i.e., the first branched sheet conveyance passage K4 and the second branched sheet conveyance passage K5) separately. Consequently, the first sheet P1 is guided to the first branched sheet conveyance passage K4, and the second sheet P2 is guided to the second branched sheet conveyance passage K5. Subsequently, as illustrated in FIGS. 10A to 10C and 12E, the separation claws 16 move to the standby positions, and the second conveyance roller pair 5 conveys the inner sheet PM to the one end of the third sheet conveyance passage K3, that is, the right side in FIGS. 10A to 10C, to insert the inner sheet PM between the first sheet P1 and the second sheet P2 separated from the two-ply sheet PJ.

As described above, each of the separation claws 16 in the present embodiment functions as a separator that separates (in other words, peels) the non-bonding portion of the first sheet P1 and the second sheet P2 of the two-ply sheet PJ, and also functions as a switcher that separately guides the separated two sheets, which are the first sheet P1 and the second sheet P2, to the first branched sheet conveyance passage K4 and the second branched sheet conveyance passage K5, respectively. Accordingly, the above-described configuration reduces the size and cost of the sheet laminator 50, when compared with the configuration of a sheet separation device including the separator and the switcher as different units. In other words, the above-described configuration efficiently and preferably can separate the first sheet P1 and the second sheet P2 of the two-ply sheet PJ.

The seventh sensor 47 optically detects that the first sheet P1 separated apart from the second sheet P2 is successfully conveyed to the first branched sheet conveyance passage K4. Further, the eighth sensor 48 optically detects that the second sheet P2 separated apart from the first sheet P1 is successfully conveyed to the second branched sheet conveyance passage K5.

Each separation claw 16 in the present embodiment functions as a separator and a switcher. However, the sheet separation device 1 according to the present embodiment may further include a member that functions as a switcher, different from the separation claw 16 that functions as a separator.

A description is given of a first guide 25 provided in the sheet separation device 1 according to the present embodiment, with reference to, for example, FIGS. 8A and 8C.

The first guide 25 is disposed between the separation claws 16 and the winding roller in the third sheet conveyance passage K3. The first guide 25 functions as a limiter to limit an amount of slack (in other words, a deflection amount) of the first sheet P1 that is wound around the winding roller 20 on the inner side of the first sheet P1 and the second sheet P2 of the two-ply sheet PJ.

More specifically, the first guide 25 that functions as a limiter is a conveyance guide disposed on the side in which the winding roller 20 is disposed with respect to an imaginary plane S1, that is, above the imaginary plane S1 in FIG. 8A, in the third sheet conveyance passage K3. The imaginary plane S1 is an imaginary plane passing through the winding start position W of the winding roller 20 and the nip region of the third conveyance roller pair 6 in the third sheet conveyance passage K3 (see FIG. 8A). The first guide 25 has a shape like substantially a triangular prism having a plane along the outer circumferential surface of the winding roller 20, and the plane covers a part of the outer circumferential surface of the winding roller 20 and is separated from the winding roller 20 by a predetermined gap. The first guide 25 functions as a conveyance guide of the third sheet conveyance passage K3 and a conveyance guide of the first branched sheet conveyance passage K4. In other words, the first guide 25 guides the sheet conveyed through the third sheet conveyance passage K3, the sheet conveyed through the first branched sheet conveyance passage K4, and the sheet wound around the winding roller 20.

In particular, in the third sheet conveyance passage K3, the first guide 25 limits bending the two-ply sheet PJ upward (in particular, bending the first sheet P1 upward) between the winding roller 20 and the third conveyance roller pair 6. Due to such a configuration, the gap C in the two-ply sheet PJ that is formed by bending the first sheet P1 upward is intensively formed between the first guide 25 and the third conveyance roller pair 6. Accordingly, the above-described configuration increases the size of the gap C even if the winding amount of the two-ply sheet PJ wound around the winding roller 20 is not large, and the separation claws 16 smoothly enter the gap C to separate the two-ply sheet PJ.

A description is given of a second guide 26 provided in the sheet separation device 1 according to the present embodiment, with reference to, for example, FIGS. 8A and 8C.

The second guide 26 is disposed between the separation claws 16 and the winding roller 20 in the third sheet conveyance passage K3. The second guide 26 functions as a guide to guide the second sheet P2 that is an outer sheet of the two sheets P1 and P2 of the two-ply sheet PJ wound around the winding roller 20.

More specifically, the second guide 26 that functions as a guide is a sheet conveyance guide disposed on the side in which the winding roller 20 is not disposed with respect to the imaginary plane S1, that is, below the imaginary plane S1 in FIG. 8A, in the third sheet conveyance passage K3. The second guide 26 is disposed to face the lower face of the sheet from a portion close and upstream from the second conveyance roller pair 5 in the forward direction to a portion close and downstream from the third conveyance roller pair 6 in the forward direction. In other words, the second guide 26 guides the sheet conveyed in the third sheet conveyance passage K3.

In particular, in the third sheet conveyance passage K3 between the winding roller 20 and the third conveyance roller pair 6, a clearance between the first guide 25 and the second guide 26 is set to be a value by which the sheet having the largest thickness is conveyed. Since this setting limits a gap between the first sheet P1 and the second sheet P2 of the two-ply sheet PJ so as not to be too large between the first guide 25 and the second guide 26, the gap C in the two-ply sheet PJ that is formed by bending the first sheet P1 upward is intensively formed. Accordingly, the separation claws 16 smoothly enter the gap C to separate the two-ply sheet PJ.

A description is given of the sixth sensor 46, with reference to, for example, FIG. 8A.

The sixth sensor 46 functions as an abnormal condition detection sensor or an abnormal condition detector to detect an abnormal condition in which the gap C formed between the first sheet P1 and the second sheet P2 at a predetermined position (that is, a position between the third conveyance roller pair 6 and the winding roller 20) is not larger than a predetermined size before the separation claws 16 move from the standby positions, to be more specific, before the separation claws 16 move from the standby positions illustrated in FIG. 16 to the separation positions illustrated in FIGS. 11 and 12A. The predetermined size is the size of the gap C into which the separation claws 16 enter, which is determined by experiments. In other words, the sixth sensor 46 that functions as the abnormal condition detector detects the abnormal condition in which the gap C formed between the first sheet P1 and the second sheet P2 at a predetermined position is not larger than the predetermined size before the separation claws 16 are inserted into the gap C.

In other words, at a timing at which the gap C is formed between the first sheet P1 and the second sheet P2, as illustrated in FIGS. 7D and 8A, the sixth sensor 46 that functions as the abnormal condition detector detects the abnormal condition such as a state in which the gap is not formed at all or a state in which the gap is not formed as a sufficient gap C. In the present embodiment, the controller 200 notifies occurrence of an abnormal condition when the abnormal condition is detected by the sixth sensor 46 (abnormal condition detector). Specifically, as illustrated in FIG. 1, the image forming apparatus 100 includes the operation display panel 49 that functions as an operation display device on the exterior of the image forming apparatus 100 of the image forming system 300 to display various kinds of information about the image forming system 300 and input various kinds of commands. When the controller 200 determines the abnormal condition based on the results detected by the sixth sensor 46, that is, when the two-ply sheet PJ does not have the sufficiently large gap C, the controller 200 controls the operation display panel 49 to display that the abnormal condition is detected. For example, the operation display panel 49 displays "Since an abnormal condition has occurred, the process of inserting the inner sheet is stopped. Please check the setting direction of the two-ply sheet in the unit sheet feed tray. If the setting direction is correct and similar abnormal conditions are repeated, please contact a service person."

The above-described sixth sensor 46 that functions as the abnormal condition detector may be, for example, a lever type sensor that comes into contact with the upper first sheet P1 of the two-ply sheet PJ forming the gap C larger than the predetermined size.

A description is now given of the operations performed in the processing apparatus to separate the two-ply sheet PJ, with reference to FIGS. 6A to 10C.

Figure 14:
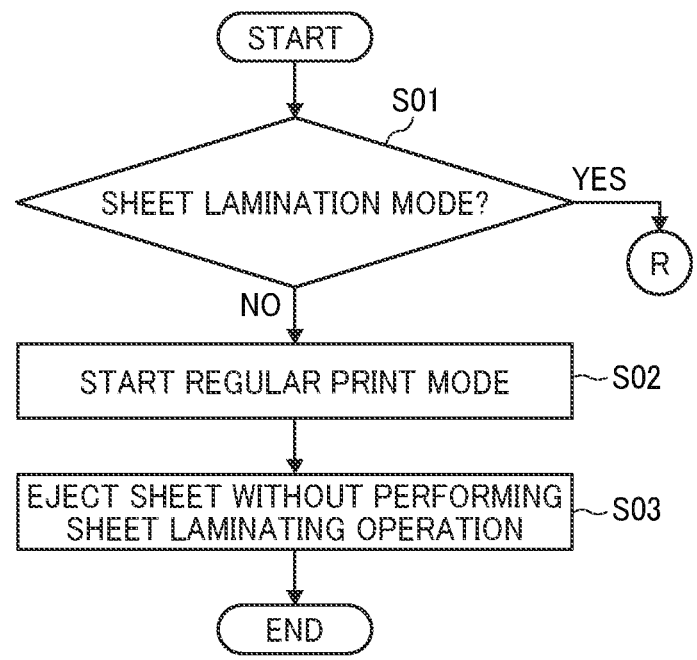
FIG. 14 is a flowchart illustrating a flow of a control process executed in the image forming system.

FIG. 14 is a flowchart illustrating a flow of a control process executed in the image forming system 300.

Figures 15, 15A, 15B:
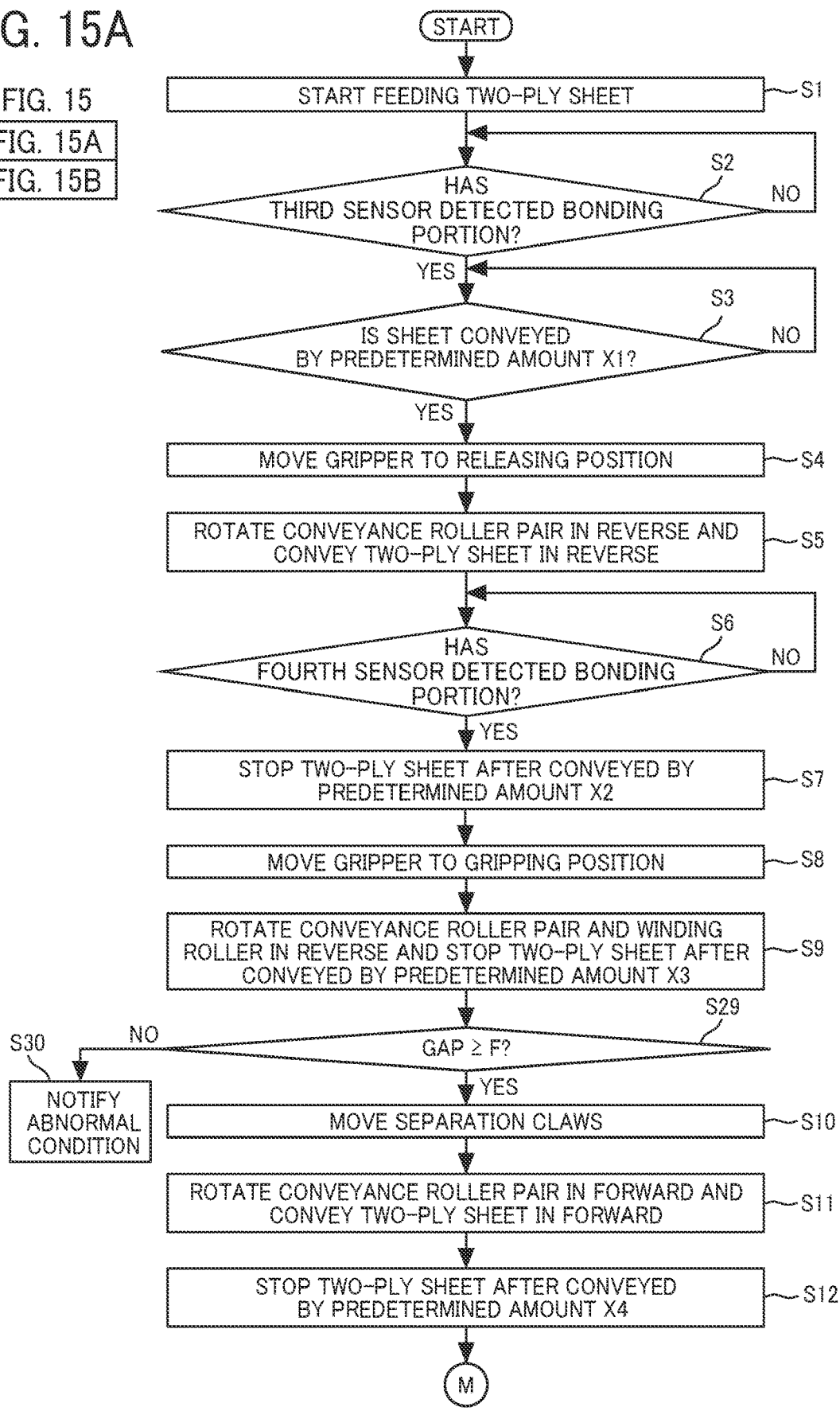
FIG. 15 including
FIGS. 15A and 15B is a flowchart illustrating a flow of a subsequent control process subsequent from the flowchart of FIG. 14, executed in a sheet lamination mode.
Figure 15B:
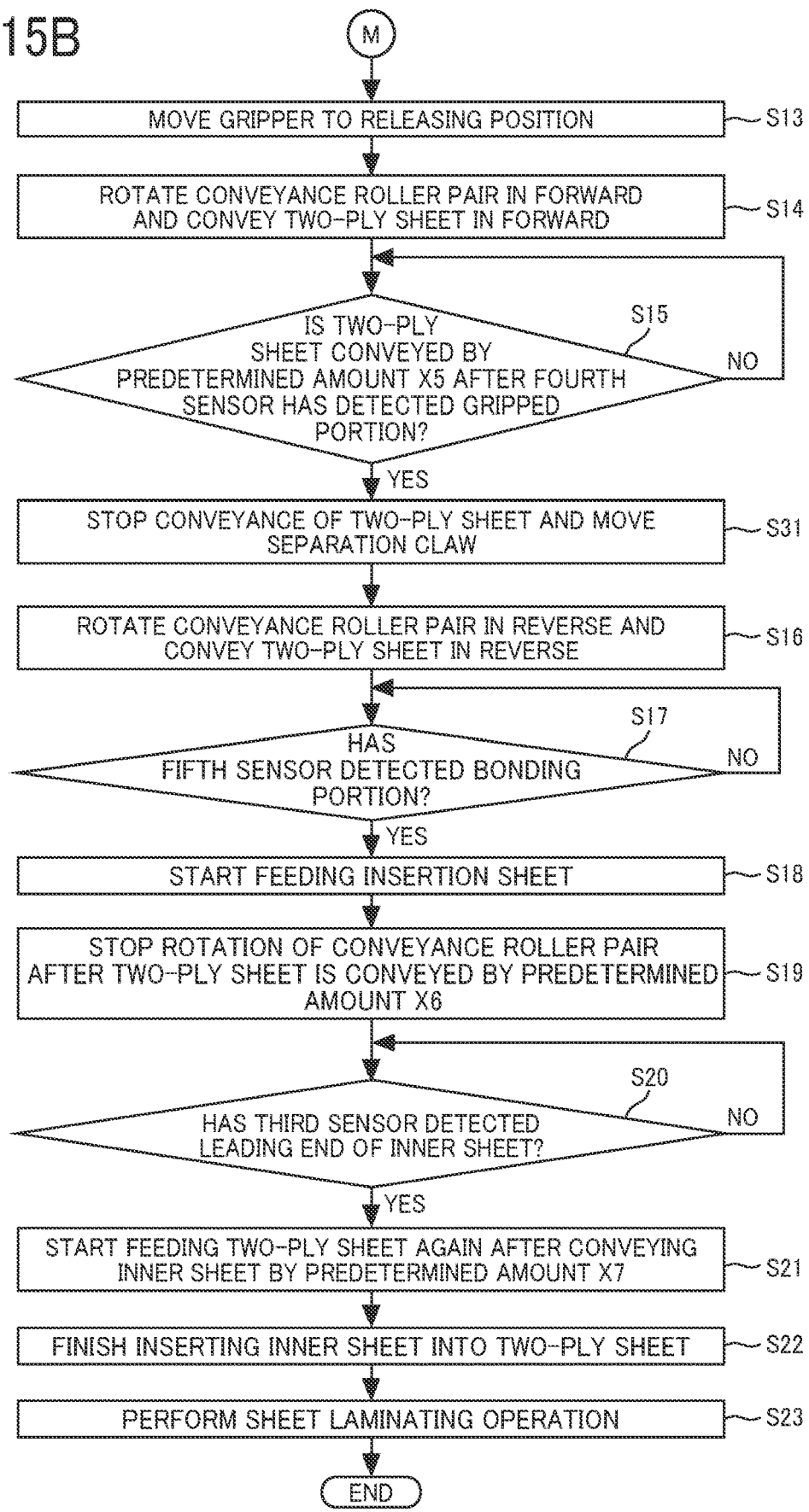

FIG. 15 including FIGS. 15A and 15B is a flowchart illustrating a flow of a subsequent control process subsequent from the flowchart of FIG. 14, executed in a sheet lamination mode.

In the description of the operations, the operations of the separation claws 16 are appropriately described with reference to FIGS. 11 to 12E and the control flow is appropriately described with reference to a flowchart of FIGS. 14 and 15 including FIGS. 15A and 15B.

First, when the print operation command is issued, the controller 200 determines whether the print mode is the "sheet lamination mode" (step S01 of FIG. 14). As a result, when the print mode is not the sheet lamination mode (NO in step S01 of FIG. 14), it is determined that the regular print mode is selected. Accordingly, the controller 200 starts the regular print mode (step S02 of FIG. 14). Then, the print operation is performed on the sheet P that is fed from the apparatus sheet tray 112. After completion of the print operation, the sheet laminating operation is not performed on the sheet P and the sheet P with the image is ejected to the second ejection tray 55 (step S03 of FIG. 14). After completion of step S03, the flow of the print operation is completed.

By contrast, when it is determined that the sheet lamination mode is selected as the print mode (YES in step S01 of FIG. 14), the control flow of the flowchart in FIG. 15 including FIGS. 15A and 15B is executed.

First, the sheet feed roller 2 and the first conveyance roller pair 4 start feeding the two-ply sheet PJ from the unit sheet tray 11 in step S1 of FIG. 15A. Then, as illustrated in FIG. 6A, the second conveyance roller pair 5 conveys the two-ply sheet PJ with the bonding portion A as a leading end of the two-ply sheet PJ in the forward direction that is a direction from the right side to the left side in FIGS. 6A to 6D in the third sheet conveyance passage K3.

At this time, the controller 200 causes the moving mechanism 30 to position the gripper 32 at the gripping position.

In other words, the cam 34 moves to a rotational position at which the cam 34 does not press the arm 31. When the gripper 32 is positioned at the gripping position as described above, the gripper 32 does not block conveyance of the sheet in the third sheet conveyance passage K3. The separation claws 16 stand by at the standby positions (illustrated in FIG. 12A) at which the separation claws 16 cannot block conveyance of the sheet in the third sheet conveyance passage K3.

Then, as illustrated in FIG. 6B, the controller 200 determines whether the third sensor 43 has detected the bonding portion A of the two-ply sheet PJ (i.e., the leading end of the two-ply sheet PJ conveyed in the forward direction, in other words, the one end of the two-ply sheet PJ), in step S2 of FIG. 15A. When the third sensor 43 has not detected the bonding portion A of the two-ply sheet PJ (NO in step S2 of FIG. 15A), step S2 is repeated until the third sensor 43 detects the bonding portion A of the two-ply sheet PJ. By contrast, when the third sensor 43 has detected the bonding portion A of the two-ply sheet PJ (YES in step S2 of FIG. 15A), in response to the timing of detection of the bonding portion A of the two-ply sheet PJ by the third sensor 43, the controller 200 causes the third conveyance roller pair 6 to convey the two-ply sheet PJ in the forward direction by a predetermined amount X1 until the gripped portion B of the two-ply sheet PJ (i.e., the trailing end of the two-ply sheet PJ conveyed in the forward direction, in other words, the other end of the two-ply sheet PJ) passes the position of the winding roller 20, in step S3 of FIG. 15A.

As illustrated in FIG. 6C, the controller 200 causes the third conveyance roller pair 6 to temporarily stop conveyance of the two-ply sheet PJ conveyed by the predetermined amount X1 and causes the gripper 32 to move from the gripping position to the releasing position in step S4 of FIG. 15A. In other words, the controller causes the cam 34 to move to a rotational position at which the cam 34 pushes the arm 31. While the cam 34 presses the arm 31, the gripped portion B of the two-ply sheet PJ can be received between the gripper 32 and the receiving portion 20b of the winding roller 20.

Then, as illustrated in FIG. 6D, the controller 200 causes the third conveyance roller pair 6 to rotate in the reverse direction to start conveyance of the two-ply sheet PJ in the reverse direction in step S5 of FIG. 15A. At this time, the fourth sensor 44 detects the gripped portion B of the two-ply sheet PJ, that is, the other end of the two-ply sheet PJ and the leading end of the two-ply sheet PJ conveyed in the reverse direction.

Subsequently, the controller 200 determines whether the fourth sensor 44 has detected the gripped portion B of the two-ply sheet PJ, in step S6 of FIG. 15A. When the fourth sensor 44 has not detected the gripped portion B (NO in step S6 of FIG. 15A), step S6 is repeated until the fourth sensor 44 detects the gripped portion B of the two-ply sheet PJ. By contrast, when the fourth sensor 44 has detected the gripped portion B (YES in step S6 of FIG. 15A), as illustrated in FIG. 7A, in response to the timing of detection of the gripped portion B of the two-ply sheet PJ by the fourth sensor 44, the controller 200 causes the third conveyance roller pair 6 to convey the two-ply sheet PJ by a predetermined amount X2 until the gripped portion B of the two-ply sheet PJ reaches the position of the winding roller 20, that is, the winding start position W. Then, the controller 200 causes the third conveyance roller pair 6 to stop conveyance of the two-ply sheet PJ, in step S7 of FIG. 15A.

Then, as illustrated in FIG. 7B, the gripper 32 is moved from the releasing position to the gripping position while the gripped portion B of the two-ply sheet PJ is at the winding start position W, in step S8 of FIG. 15A. In other words, the controller 200 causes the cam 34 to move to a rotational position at which the cam 34 does not press the arm 31. While the cam 34 is at the rotational position, as illustrated in FIG. 7B', the end face of the other end of the two-ply sheet PJ does not contact any member, and the gripped portion B of the two-ply sheet PJ is gripped between the gripper 32 and the receiving portion 20b.

Then, as illustrated in FIG. 7C, the winding roller 20 rotates in the reverse direction (that is, the counterclockwise direction) while the gripper 32 grips the two-ply sheet PJ, and the third conveyance roller pair 6 rotates again in the reverse direction together with the winding roller 20. At this time, as the winding roller 20 rotates, the gap C is formed between the first sheet P1 and the second sheet P2 of the two-ply sheet PJ in the area between the winding roller 20 and the third conveyance roller pair 6, as illustrated in FIG. 7D. As the gap C is formed, the first guide 25 and the second guide 26 limit the warp (slack) of the two-ply sheet PJ in the vicinity of the winding roller 20. As a result, the gap C of the two-ply sheet PJ is intensively formed near the third conveyance roller pair 6.

Since the controller 200 determines the timing at which the gripper 32 and the receiving portion 20b grip the gripped portion B of the two-ply sheet PJ in response to the timing of detection of the leading end of the two-ply sheet PJ conveyed in the reverse direction by the fourth sensor 44 disposed downstream from the third conveyance roller pair 6 in the reverse direction, the gripped portion B of the two-ply sheet PJ can be accurately conveyed to a desired gripping position regardless of variations in the sheet lengths with respect to the sheet conveyance amount X2. The size of sheets includes an error even if the sheets are sold as the same size.

Further, by detecting the leading end of the two-ply sheet PJ conveyed in the reverse direction by the fourth sensor 44, the sheet conveyance amount X2 that is measured according to the detection can be reduced regardless of the sheet length. For this reason, the above-described configuration can reduce variation in the sheet conveyance amount X2 and can accurately convey the gripped portion B of the two-ply sheet PJ to the desired gripping position.

Accordingly, the fourth sensor 44 is preferably disposed near the winding roller 20.

With reference to FIG. 7C', the above description was given of a mechanism that generates the gap C in the two-ply sheet PJ. As described above, the gap C is generated in the two-ply sheet PJ between the winding roller 20 and the third conveyance roller pair 6 by winding the two-ply sheet PJ around the winding roller 20.

The detailed description is given of the mechanism as follows.

The two-ply sheet PJ wound around the winding roller 20 is gripped by the gripper 32, restricting misalignment in the sheet. Due to this configuration, a slip is generated between the first sheet P1 and the second sheet P2 by the amount of the circumferential length of the winding roller 20. Due to the slip, the conveyance amount of the inner sheet (i.e., the first sheet P1) is smaller than the conveyance amount of the outer sheet (i.e., the second sheet P2). As a result, warp (slack) is generated in the inner sheet (i.e., the first sheet P1) between the nip region of the third conveyance roller pair 6 and the winding roller 20. At this time, as the two-ply sheet PJ is wound around the winding roller 20 by one or more rounds, the difference in the winding circumferential length is generated between the inner circumference and the outer circumference by the thickness of the sheet. As a result, the warp (slack) is additionally generated.

Specifically, a distance from the rotary shaft 20*a* (i.e., the center of the shaft) of the winding roller 20 to the outer sheet P2 is R+$\Delta$R when a distance from the rotary shaft 20*a* (i.e., the center of the shaft) of the winding roller 20 to the inner sheet P1 is R, and the thickness of the inner sheet P1 is $\Delta$R. Since the radius of the first sheet P1 wound around the inner side of the winding roller 20 and the radius of the second sheet P2 wound around the outer side of the first sheet P1 are different by the thickness $\Delta$R of the first sheet P1 (wound around the inner side of the winding roller 20), a circumferential length difference of $2 \times \Delta R \times \pi$ is generated between the inner sheet (first sheet P1) and the outer sheet (second sheet P2) when the two-ply sheet PJ is wound around the winding roller 20 by one round. As a result, winding the two-ply sheet PJ around the winding roller 20 M times generates the circumferential length difference of $2 \times \Delta R \times \pi \times M$ that is a slack of the inner sheet P1.

Finally, the warp (slack) is accumulated between the third conveyance roller pair 6 and the winding roller 20, and the gap C corresponding to $2 \times \Delta R \times \pi \times M$ is formed between the first sheet P1 and the second sheet P2.

Then, the controller 200 causes the third conveyance roller pair 6 and the winding roller 20 to rotate in the reverse direction. At the timing at which the third conveyance roller pair 6 has conveyed the two-ply sheet PJ by a predetermined amount X3 since the start of winding of the two-ply sheet PJ by the winding roller 20, the controller 200 causes the third conveyance roller pair 6 to stop conveyance of the two-ply sheet PJ and the winding roller 20 to stop winding the two-ply sheet PJ, as illustrated in FIG. 8A, in step S9 of FIG. 15A. While the conveyance and winding of the two-ply sheet PJ are stopped, the two-ply sheet PJ is wound around the winding roller 20 one or more times, and the gap C in the two-ply sheet PJ (i.e., the distance between the first sheet P1 and the second sheet P2 in the vertical direction) is sufficiently widened if the two-ply sheet PJ is normally separated.

When the gap C is sufficiently widened, the controller 200 determines whether the sixth sensor 46 detects that the gap C equal to or larger than a predetermined distance F is formed in the two-ply sheet PJ, in step S29 of FIG. 15A.

As a result, when the controller 200 determines that the gap C is the sufficiently large gap equal to or greater than the predetermined distance F, the controller 200 determines that the subsequent sheet separating operations of the separation claws 16 do not cause a problem and controls the separation claws 16 to insert into the gap C sufficiently widened in the two-ply sheet PJ, as illustrated in FIG. 8B, in step S10 of FIG. 15A. In other words, as illustrated in FIGS. 11 and 12A, each of the separation claws 16 in pair is moved from the standby position to the separation position.

Then, as illustrated in FIG. 8C, the third conveyance roller pair 6 and the winding roller 20 start rotating in the forward direction, in other words, in the clockwise direction, in step S11 of FIG. 15A, while the separation claws 16 are inserted in the gap C. In other words, as illustrated in FIGS. 12A to 12C, the separation claws 16 that are inserted in the gap C of the two-ply sheet PJ relatively move from the one end (bonding portion A) to the other end (gripped portion B) with respect to the two-ply sheet PJ. The above-described relative movement in the present embodiment is achieved by moving the two-ply sheet PJ itself in a direction indicated by arrow in FIGS. 12A to 12C, without changing the positions of the separation claws 16 in the sheet conveyance direction.

Then, as illustrated in FIG. 9A, the controller 200 causes the third conveyance roller pair 6 and the winding roller 20 to stop rotating in the forward direction after the third conveyance roller pair 6 has conveyed the two-ply sheet PJ in the forward direction by a predetermined amount X4, in step S12 of FIG. 15A. At this time, the gripped portion B of the two-ply sheet PJ is positioned on the third sheet conveyance passage K3 (that is, at the winding start position W illustrated in FIG. 7B), which is a state in which the gripper 32 may release the gripped portion B. In addition, as illustrated in FIG. 12C, the separation claws 16 stop near the other end of the two-ply sheet PJ after the separation claws 16 are inserted into the gap C of the two-ply sheet PJ and relatively move to the other end (gripped portion B) of the two-ply sheet PJ with respect to the two-ply sheet PJ.

While the separation claws 16 stop near the other end of the two-ply sheet PJ, the gripper 32 moves from the gripping position to the releasing position in step S13 of FIG. 15B. In other words, the controller 200 causes the cam 34 to move to the rotational position at which the cam 34 does not press the arm 31. By so doing, the gripper 32 releases the gripping of the two-ply sheet PJ. In the present embodiment, the cam 34 in the moving mechanism 30 moves to release the gripping of the two-ply sheet PJ by the gripper 32. However, when the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 can be released by pulling the two-ply sheet PJ from the gripper 32 due to conveyance of the two-ply sheet PJ by the third conveyance roller pair 6 without moving the cam 34 in the moving mechanism 30.

Then, as illustrated in FIG. 9B, the controller 200 causes the third conveyance roller pair 6 to rotate in the forward direction again to start conveyance of the two-ply sheet PJ in the forward direction, in step S14 of FIG. 15B. In addition, after the gripped portion B of the two-ply sheet PJ, i.e., the other end of the two-ply sheet PJ and the trailing end of the two-ply sheet PJ in the forward direction, passes over the branch portion between the third sheet conveyance passage K3 and each of the first branched sheet conveyance passage K4 and the second branched sheet conveyance passage K5, the gripper 32 moves from the releasing position to the gripping position. Further, at this time, the fourth sensor 44 detects the gripped portion B of the two-ply sheet PJ, i.e., the other end of the two-ply sheet PJ and the trailing end of the two-ply sheet PJ conveyed in the forward direction.

Then, the controller 200 determines whether the third conveyance roller pair 6 conveys the two-ply sheet PJ by a predetermined amount X5 in response to the timing at which the fourth sensor 44 detects the trailing end of the two-ply sheet PJ conveyed in the forward direction, in other words, after the fourth sensor 44 has detected the gripped portion B of the two-ply sheet PJ, in step S15 of FIG. 15B. When the third conveyance roller pair 6 does not convey the two-ply sheet PJ by the predetermined amount X5 after the fourth sensor 44 has detected the gripped portion B of the two-ply sheet PJ (NO in step S15 of FIG. 15B), step S15 is repeated until the third conveyance roller pair 6 conveys the two-ply sheet PJ by the predetermined amount X5 after the fourth sensor 44 has detected the gripped portion B of the two-ply sheet PJ. By contrast, when the third conveyance roller pair 6 conveys the two-ply sheet PJ by the predetermined amount X5 after the fourth sensor 44 has detected the gripped portion B of the two-ply sheet PJ (YES in step S15 of FIG. 15B), as illustrated in FIG. 12D, the controller 200 causes the third conveyance roller pair 6 to stop conveying the two-ply sheet PJ and causes the separation claws 16 to move in the width direction of the two-ply sheet PJ, in step S31 of FIG. 15B. As a result, as illustrated in FIG. 9B, the trailing ends of the first sheet P1 and the second sheet P2 of the two-ply sheet PJ conveyed in the forward direction are separated and largely opened (see FIG. 12D). At this time, the controller 200 starts to perform the sheet separating operation on the two-ply sheet PJ.

Then, as illustrated in FIG. 9C, the third conveyance roller pair 6 rotates in reverse to start conveyance of the two-ply sheet PJ in the reverse direction in step S16 of FIG. 15B. At this time, since the separation claws 16 are disposed at the switching positions at which the separation claws 16 block the two-ply sheet PJ moving to the third sheet conveyance passage K3 (i.e., the position illustrated in FIG. 12D), the first sheet P1 and the second sheet P2 separated from each other are guided to the first branched sheet conveyance passage K4 and the second branched sheet conveyance passage K5, respectively, as illustrated in FIG. 9C. At this time, the fifth sensor 45 (see FIG. 2) detects the bonding portion A of the two-ply sheet PJ, that is, the one end of the two-ply sheet PJ and the trailing end of the two-ply sheet PJ conveyed in the reverse direction. Subsequently, the controller 200 determines whether the fifth sensor 45 (see FIG. 2) that functions as a sheet detector has detected the trailing end of the two-ply sheet PJ conveyed in the reverse direction, that is, the bonding portion A, in step S17 of FIG. 15B. In response to the timing of detection of the trailing end of the two-ply sheet PJ in the reverse direction by the fifth sensor 45 (see FIG. 2), the controller 200 causes the sheet feed roller 197 to feed the inner sheet PM from the apparatus sheet tray 112, in step S18 of FIG. 15B.

The timing at which the sheet feed roller 197 starts to feed the inner sheet PM is not limited to the above-described timing. It is preferable to set the timing to reduce the time to be taken for the sheet lamination mode depending on the time required for printing an image on the inner sheet PM in the image forming apparatus 100.

Subsequently, as illustrated in FIG. 10A, in response to the timing of detection of the trailing end of the two-ply sheet PJ in the reverse direction by the fifth sensor 45 (see FIG. 2), the controller 200 causes the third conveyance roller pair 6 to rotate to convey the two-ply sheet PJ by a predetermined amount X6, and then stop the conveyance of the two-ply sheet PJ when the two-ply sheet PJ has been conveyed by the predetermined amount X6, in step S19 of FIG. 15B. When the third conveyance roller pair 6 conveys the two-ply sheet PJ by the predetermined amount X6, the bonding portion A of the two-ply sheet PJ is in the nip region of the third conveyance roller pair 6 or at a position slightly leftward from the nip region of the third conveyance roller pair 6. In other words, the one end of the two-ply sheet PJ is nipped by the third conveyance roller pair 6. With this state, the sheet separating operation of the two-ply sheet PJ is completed.

Further, before completion of the sheet separating operation of the two-ply sheet PJ, the inner sheet PM has already been fed from the apparatus sheet tray 112 and the print operation on the inner sheet PM has substantially been completed. Since the inner sheet PM is fed from the second feed tray 12, as illustrated in FIG. 10A, when the sheet separating operation on the two-ply sheet PJ is completed, the leading end of the inner sheet PM (i.e., at one end of the inner sheet PM in the forward direction) has approached the position at which the inner sheet PM is inserted between the first sheet P1 and the second sheet P2 of the two-ply sheet PJ.

On the other hand, the third sensor 43 detects the leading end of the inner sheet PM (i.e., at one end of the inner sheet PM in the forward direction). In addition, as illustrated in FIG. 10B, in response to the detection of the leading end of the inner sheet PM, the separation claws 16 move to the respective standby positions at the timing at which the separation claws 16 do not block conveyance of the inner sheet PM.

Figure 12E:
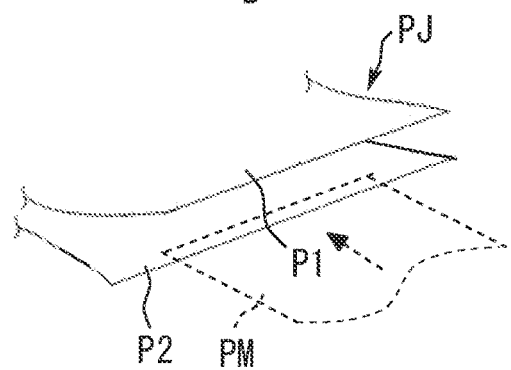

Further, as illustrated in FIGS. 10C and 12E, the controller 200 determines whether the third sensor 43 has detected the leading end of the inner sheet PM in the forward direction, in step S20 of FIG. 15B. When the third sensor 43 has not detected the leading end of the inner sheet PM in the forward direction (NO in step S20 of FIG. 15B), step S20 is repeated until the third sensor 43 detects the leading end of the inner sheet PM in the forward direction. By contrast, when the third sensor 43 has detected the leading end of the inner sheet PM in the forward direction (YES in step S20 of FIG. 15B), in response to the detection of the leading end of the inner sheet PM, the controller 200 causes the second conveyance roller pair to convey the inner sheet PM by a predetermined amount X7. Then, the controller 200 causes the third conveyance roller pair 6 to start conveying the two-ply sheet PJ in the forward direction again, in step S21 of FIG. 15B. At this time, the inner sheet PM is accurately nipped at a desired position between the first sheet P1 and the second sheet P2 of the two-ply sheet PJ.

Thus, the controller 200 finishes the sheet inserting operation to insert the inner sheet PM in the two-ply sheet PJ, in other words, between the first sheet P1 and the second sheet P2 of the two-ply sheet PJ (step S22 of FIG. 15B).

Thereafter, the controller 200 causes the third conveyance roller pair 6 to convey the two-ply sheet PJ (in which the inner sheet PM has been inserted after the sheet separating operation) to pass through the fourth sheet conveyance passage K6, and is then conveyed to the sheet lamination device 51. After the two-ply sheet PJ passes through the sheet lamination device 51, the entire region of the two-ply sheet PJ is bonded with the inner sheet PM being inserted (step S23 of FIG. 15B). Then, the two-ply sheet PJ on which the sheet laminating operation is performed as described above is ejected to the outside of the sheet lamination device 51 by an ejection roller pair 7 and is stacked on the ejection tray 13.

As described above, the sheet laminator 50 according to the present embodiment performs the sheet laminating operation as a sequence of the following operations: an operation to feed the two-ply sheet PJ; an operation to separate the first sheet P1 and the second sheet P2 of the two-ply sheet PJ; an operation to insert the inner sheet PM into the space between the first sheet P1 and the second sheet P2; and an operation to perform the sheet laminating operation on the two-ply sheet PJ in which the inner sheet PM is inserted. The sequence of these operations can enhance the user convenience for the sheet laminator 50.

By contrast, when the controller 200 determines that the gap C in the two-ply sheet PJ is not the sufficiently large gap equal to or greater than the predetermined distance F (NO in step S29 of FIG. 15A), that is, when the controller 200 determines that the abnormal condition occurs based on the results detected by the sixth sensor 46, the controller 200 determines that the subsequent sheet separating operations of the separation claws 16 cause various kinds of problems, and therefore does not move the separation claws 16 from the standby positions to the separation positions. At this time, the controller 200 causes the operation display panel 49 (see FIG. 2) to notify a user or users that the occurrence of the abnormal condition stops the sheet separating operation of the two-ply sheet PJ and the sheet inserting operation of the inner sheet PM, in step S30 of FIG. 15A.

As described above, with reference to, for example, FIG. 1, the image forming system 300 according to the present embodiment includes the image forming apparatus 100, the sheet lamination device 51, and the sheet separation device 1.

The image forming apparatus 100 forms an image on the surface of the sheet that is conveyed in the image forming apparatus 100. The sheet corresponds to the inner sheet PM in the sheet lamination mode and corresponds to the sheet P in the regular print mode. The image forming apparatus 100 is the part of the image forming system 300 other than the sheet laminator 50.

The sheet lamination device 51 includes the thermal pressure roller pairs 51a each having the heater 51b serving as a heating unit inside. The sheet lamination device 51 performs a sheet laminating operation by heating by the heater 51b serving as a heating device, on the two-ply sheet PJ in which the sheet conveyed from the image forming apparatus 100 as the inner sheet PM is inserted between the two sheets P1 and P2 of the two-ply sheet PJ. The sheet lamination device 51 is included in the sheet laminator 50 together with the sheet separation device 1.

The sheet separation device 1 performs a sheet separating operation and a sheet inserting operation. To be more specific, the sheet separation device 1 performs the sheet separating operation to separate the non-bonding portion of the two-ply sheet PJ in which two sheets, which are the first sheet P1 and the second sheet P2, are overlapped and bonded together at one end of the two-ply sheet PJ as the bonding portion A of the two-ply sheet PJ. The sheet separation device 1 then performs the sheet inserting operation to insert the inner sheet PM between the first sheet P1 and the second sheet P2 separated from each other by the sheet separating operation. The sheet separation device 1 is disposed downstream from the image forming apparatus 100 in the sheet conveyance direction and upstream from the sheet lamination device 51 in the sheet conveyance direction.

In the image forming system 300 according to the present embodiment, when a specific abnormal event occurs among a plurality of abnormal events that may occur in the image forming apparatus 100, the "control mode" in which the heating by the heater 51b (heating unit) of the sheet lamination device 51 of the sheet laminator 50 is maintained for the predetermined time Tz can be executed, and when an abnormal event other than the specific abnormal event occurs, the heating by the heater 51b is interrupted, in other words, is turned off.

The "control mode" described above is referred to as "lamination fixing temperature maintenance mode" as appropriate.

In other words, in the present embodiment, when an abnormal condition occurs in the image forming apparatus 100, the heater 51b of the sheet lamination device 51 is not generally turned off regardless of the kind of the abnormal condition, but the heater 51b of the sheet lamination device 51 can be continuously turned on depending on the kind of the abnormal condition, in other words, the "lamination fixing temperature maintenance mode" ("control mode") can be executed.

More specifically, when a relatively minor abnormal condition such as a jam (paper jam) occurs in the image forming apparatus 100, the user perform prompt handling (maintenance on the image forming apparatus 100) to eliminate the abnormal condition by making access to the image forming apparatus 100 alone without exposing (making access to) the inside of the sheet laminator 50. Due to such a configuration, the user does not need to turn off the heater 51b of the sheet lamination device 51 to eliminate such a relatively minor abnormal condition. By so doing, when restarting the image forming apparatus 100 after the maintenance, the heater 51b of the sheet lamination device 51 does not take time to heat (start) the image forming apparatus 100 to the predetermined temperature (i.e., the fixing temperature), so that the inconvenience in which the productivity of the image forming apparatus 100 is decreased at occurrence of any abnormal condition can be reduced or prevented.

On the other hand, when a relatively serious abnormal condition such as damage or breakage of the parts or components occurs in the image forming apparatus 100, the user does not need to access to the sheet laminator 50 but cannot eliminate the abnormal condition by promptly handling the abnormal condition (performing maintenance of the image forming apparatus 100). To eliminate such a relatively serious abnormal condition, the user turns off the heater 51b of the sheet lamination device 51 to prevent wasteful power consumption.

In the present embodiment, the controller 200 controls the "lamination fixing temperature maintenance mode (control mode)" to interrupt heating by the heater 51b (heating unit) after the predetermined time Tz has elapsed.

In other words, even at occurrence of the above-described specific abnormal event (minor abnormal condition), when the predetermined time Tz has elapsed since the occurrence of the abnormal event, the controller 200 determines that the user failed the prompt handling (maintenance) to eliminate the abnormal event, and the heater 51b is turned off to prevent wasteful power consumption.

In the present embodiment, any value can be set as the "predetermined time Tz" during which the "lamination fixing temperature maintenance mode (control mode)" is executed. In other words, the predetermined time to execute the control mode is set to a desired value.

More specifically, an operator such as a user or a service person operates the operation display panel 49 (see FIG. 1) to open the setting screen of the execution time (predetermined time Tz) of the lamination fixing temperature maintenance mode and set a desired execution time (predetermined time Tz).

For this reason, the image forming apparatus 100 can be easy to use and be convenient for the users having different needs, for example, the user who focuses on the power consumption of the image forming apparatus 100 and the user who focuses on the productivity of the image forming apparatus 100.

In the present embodiment, the "lamination fixing temperature maintenance mode (control mode)" is a mode in which the heating temperature (fixing temperature) by the heater 51*b* (heating unit) is maintained within a predetermined range.

More specifically, the sheet lamination device 51 is provided with a temperature sensor (temperature detector) that detects the surface temperature (fixing temperature) of the thermal pressure roller pair 51*a*. Based on detection results of the temperature sensor, the controller 200 controls whether the heater 51*b* is turned on or off so that the surface temperature (fixing temperature) of the thermal pressure roller pair 51*a* falls within the predetermined range (the temperature range suitable for the sheet laminating operation).

In the present embodiment, the "specific abnormal event" that may execute the lamination fixing temperature maintenance mode (control mode) indicates at least one of the abnormal condition in which the sheet P (including the inner sheet PM) under conveyance in the image forming apparatus 100 is jammed and the conveyance of the sheet P (the inner sheet PM) is stopped (jam) and the abnormal condition in which a door (for example, the door 160 in FIG. 20) used to expose inside the image forming apparatus 100 is opened during the image forming operation of the image forming apparatus 100 and the image forming operation of the image forming apparatus 100 is stopped.

More specifically, in the present embodiment, when a jam occurs in the image forming apparatus 100 (at occurrence of a jam), the jam is detected by jam detection sensors provided at various positions in a sheet conveyance passage (i.e., the conveyance passage indicated by the broken arrow in FIG. 1) of the image forming apparatus 100, and the operation of the image forming apparatus 100 is stopped. When the jammed sheet P (including the inner sheet PM) is removed by the user, the removal of the jammed sheet is detected by the jam detection sensors, and the operation of the image forming apparatus 100 can be resumed (recovered).

Further, in the present embodiment, when the door 160 is forcibly opened (at door opening) while the image forming apparatus 100 is under operation (including the state in which the main power source is simply turned on), the opening of the door 160 is detected by the door detection sensor to stop the operation of the image forming apparatus 100 (the printing operation cannot be performed). When the user closes the door 160, the door detection sensor detects the closed state of the door 160. In response to the detection result of the door detection sensor, the image forming apparatus 100 can resume the operation.

Since these abnormal events are relatively minor abnormal conditions that the user can perform prompt handling (maintenance) to eliminate the abnormal events, the "lamination fixing temperature maintenance mode (control mode)" can be executed as described above.

The "specific abnormal event" is not limited to the paper jam and the door opening and may be another minor abnormal condition.

In the present embodiment, when a specific abnormal event occurs (at occurrence of paper jam or door opening), the user can select to interrupt (turn off) the heating by the heater 51*b* (heating unit) without executing the "lamination fixing temperature maintenance mode (control mode)".

In other words, the user can select whether or not to execute the lamination fixing temperature maintenance mode when a specific abnormal event occurs.

More specifically, an operator such as a user or a service person operates the operation display panel 49 to open the setting screen (see FIG. 18B) for setting whether or not to execute the lamination fixing temperature maintenance mode when a specific abnormal event occurs, and then set whether or not to execute the lamination fixing temperature maintenance mode.

For this reason, the image forming apparatus 100 can be easy to use and be convenient for the users having different needs, for example, the user who focuses on the power consumption of the image forming apparatus 100 and the user who focuses on the productivity of the image forming apparatus 100.

Further, in the present exemplary embodiment, when a specific abnormal event occurs (at occurrence of paper jam or door opening) while the sheet laminating operation is being performed in the sheet lamination device 51 (of the sheet laminator 50), the controller 200 controls to continue the sheet laminating operation.

In other words, when the paper jam or the door opening occurs in the image forming apparatus 100 while the sheet laminating operation including the sheet inserting operation by the sheet separation device 1 is being performed on the inner sheet PM conveyed from the image forming apparatus 100 to the sheet laminator 50 (i.e., the sheet on which the image forming operation by the image forming apparatus 100 is performed), the controller 200 controls to complete the sheet laminating operation (including the sheet inserting operation) without interruption.

Such control is performed because the sheet laminating operation is not directly affected by occurrence of a jam in the image forming apparatus 100 or occurrence of door opening during the sheet laminating operation (including the sheet inserting operation). By performing such control, the inconvenience of deterioration in the productivity related to the sheet laminating operation is reduced or prevented.

Figure 17:
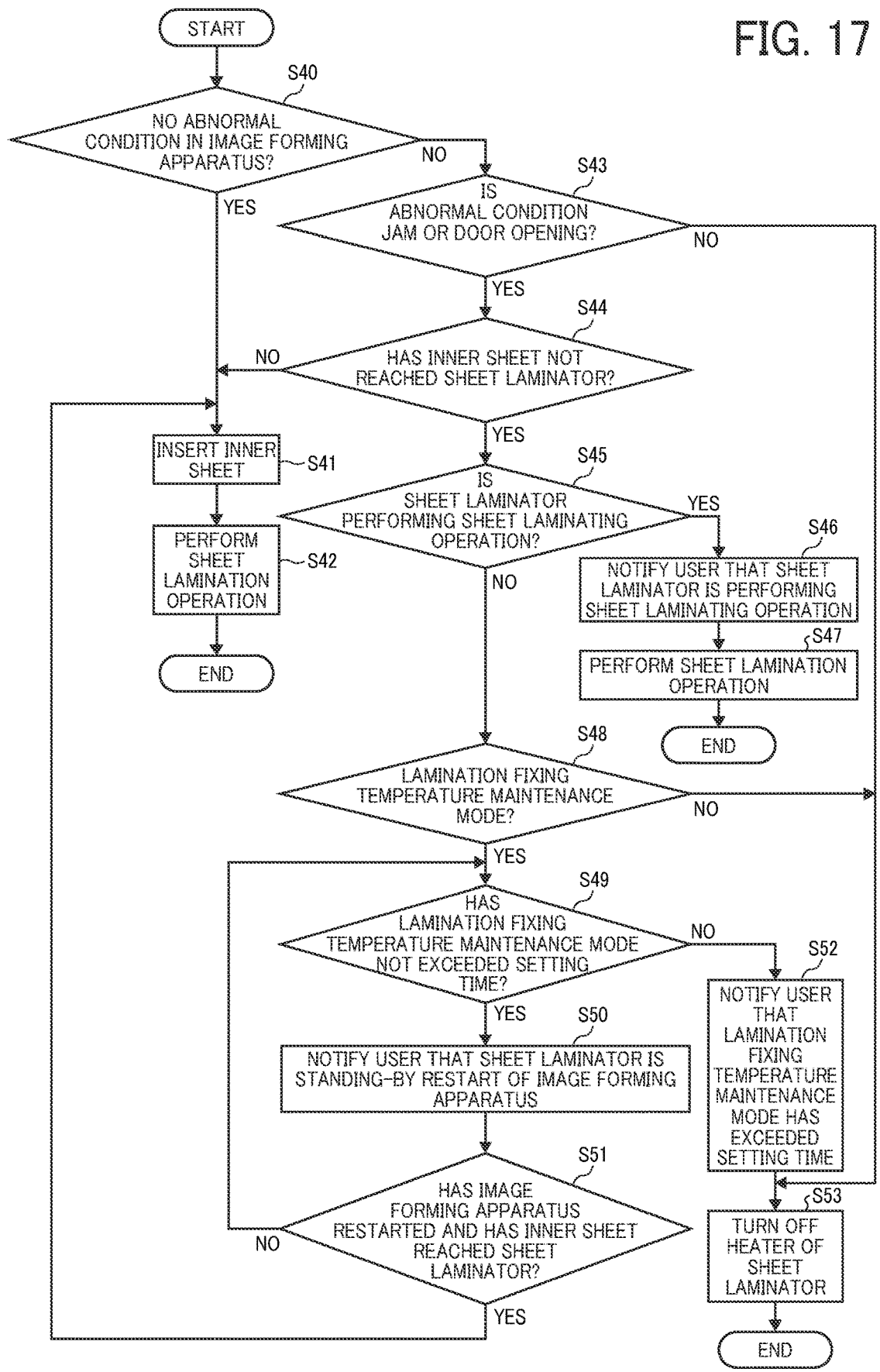
FIG. 17 is a flowchart illustrating a flow of a control process executed when any abnormal condition occurs in an image forming apparatus.

Referring now to FIG. 17, a detailed description is given of the control when abnormal condition occurs in the image forming apparatus 100 according to the present embodiment.

FIG. 17 is a flowchart illustrating a flow of a control process executed when any abnormal condition occurs in an image forming apparatus.

FIGS. 18A, 18B, 18C, and 18D are diagrams, each illustrating a display screen on an operation display panel.

In the detailed description of the control in the flowchart of FIG. 17, another description is given of the display screen of the operation display panel 49 (see FIG. 1) with respect to FIGS. 18A, 18B, 18C, and 18D. FIG. 17 is a flowchart illustrating a flow of a control process executed when any abnormality occurs in the image forming apparatus 100. FIGS. 18A, 18B, 18C, and 18D are diagrams, each illustrating a display screen on the operation display panel 49.

First, the controller 200 determines whether no abnormal condition occurs in the image forming apparatus 100 (step S40). As a result, when no abnormal condition does not occur in the image forming apparatus 100 (YES in step S40), the sheet inserting operation of the inner sheet PM is performed (step S41). Then, the sheet laminating operation is performed in the sheet lamination device 51 (step S42). Then, the flow processing ends.

By contrast, when the abnormal condition occurs in the image forming apparatus 100 (NO in step S40), the controller 200 determines whether the abnormal condition is a specified abnormal event such as a jam or door opening in the image forming apparatus 100 (step S43). As a result, when the abnormal condition is different from the specified abnormal event (such as a jam or door opening) (NO in step S43), the controller 200 causes the heater 51b of the sheet lamination device 51 to be turned off to reduce the power consumption (step S53), and end the flow of the flowchart in FIG. 17.

By contrast, when the abnormal condition is the specified abnormal event (such as a jam or door opening) (YES in step S43), the controller 200 determined whether the inner sheet PM related to the sheet laminating operation has reached the sheet laminator 50 (step S44). As a result, when the inner sheet PM has reached the sheet laminator 50 (YES in step S44), the controller 200 determines that there is no issue on the processing and perform the operations in and after step S41.

Figure 18A:
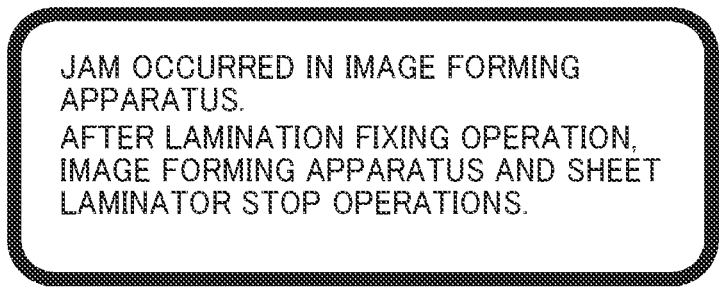
FIGS. 18A, 18B, 18C, and 18D are diagrams, each illustrating a display screen on an operation display panel.
Figure 18B:
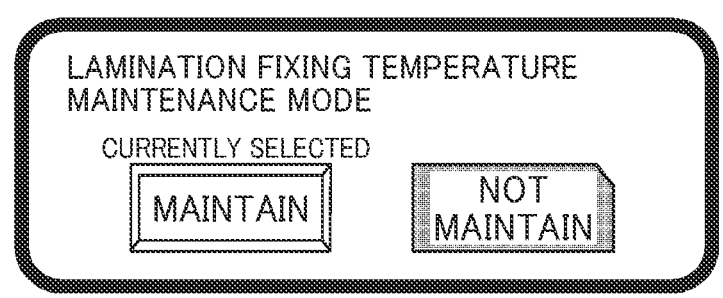

On the other hand, when the inner sheet PM has not reached the sheet laminator 50 (NO in step S44), the controller 200 determines whether the sheet laminating operation is being performed (step S45). As a result, when the sheet laminating operation is being performed (YES in step S45), the message indicating that the sheet laminating operation is being displayed (notified) on the display screen of the operation display panel 49 as illustrated in FIG. 18A (step S46). Then, the sheet laminating operation is performed (step S47), and the flow in the flowchart of FIG. 17 is ended.

On the other hand, when the sheet laminating operation is not being performed (NO in step S45), the controller 200 determines whether the lamination fixing temperature maintenance mode is selected (step S48). As described above, whether or not to execute the lamination fixing temperature maintenance mode is selected from the display screen of the operation display panel 49 illustrated in FIG. 18B.

As a result, when the lamination fixing temperature maintenance mode is not selected (NO in step S48), the flow in and after step S53 is executed.

Figure 18C:
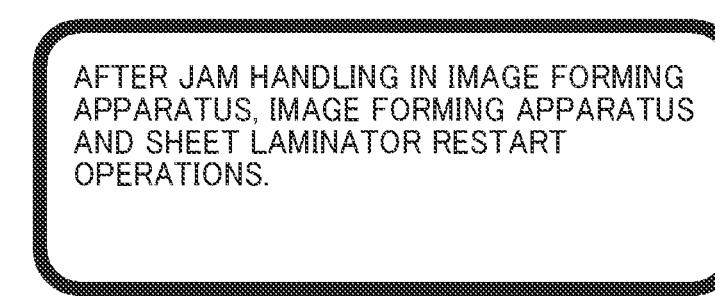

On the other hand, when the lamination fixing temperature maintenance mode is selected (YES in step S48), the controller 200 executes the lamination fixing temperature maintenance mode. Then, the controller 200 determines whether the time of the lamination fixing temperature maintenance mode has not exceeded the setting time of the lamination fixing temperature maintenance mode (predetermined time Tz) (in step S49). When the time of the lamination fixing temperature maintenance mode has not exceeded the setting time of the lamination fixing temperature maintenance mode (predetermined time Tz) (YES in step S49), the controller 200 causes the operation display panel 49 to display (notify the user of) the message indicating that the sheet laminator 50 is standing by the abnormal condition handling (in other words, the restart of the image forming apparatus 100) on the display screen as illustrated in FIG. 18C (step S50).

Subsequently, the abnormal condition handling has been performed, in other words, the image forming apparatus 100 has been restarted, and the controller 200 determines whether the inner sheet PM has reached the sheet laminator 50 (step S51). When the inner sheet PM has reached the sheet laminator 50 (YES in step S51), the controller 200 executes step S41 and the subsequent steps. When the inner sheet PM has not reached the sheet laminator 50 (NO in step S51), the controller 200 executes step S49 and the subsequent steps.

Figure 18D:
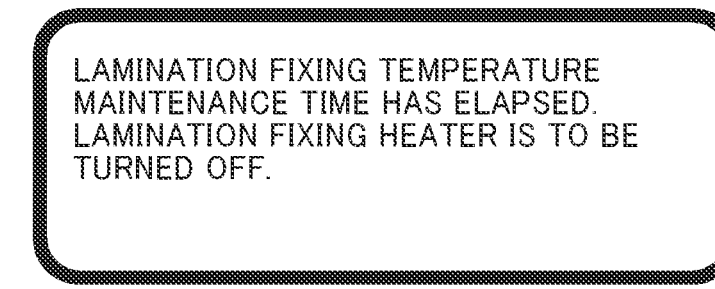

On the other hand, when the actual time of the lamination fixing temperature maintenance mode has exceeded the setting time of the lamination fixing temperature maintenance mode (predetermined time Tz) (NO in step S49), the controller 200 determines that the abnormal condition handling is taking time, and causes the operation display panel 49 to display (notify the user of) the message indicating that the setting time of the lamination fixing temperature maintenance mode (predetermined time Tz) has been exceeded on the display screen as illustrated in FIG. 18D (step S52). Then, the controller 200 executes step S53 and the subsequent steps.

Modification 1

Figure 19:
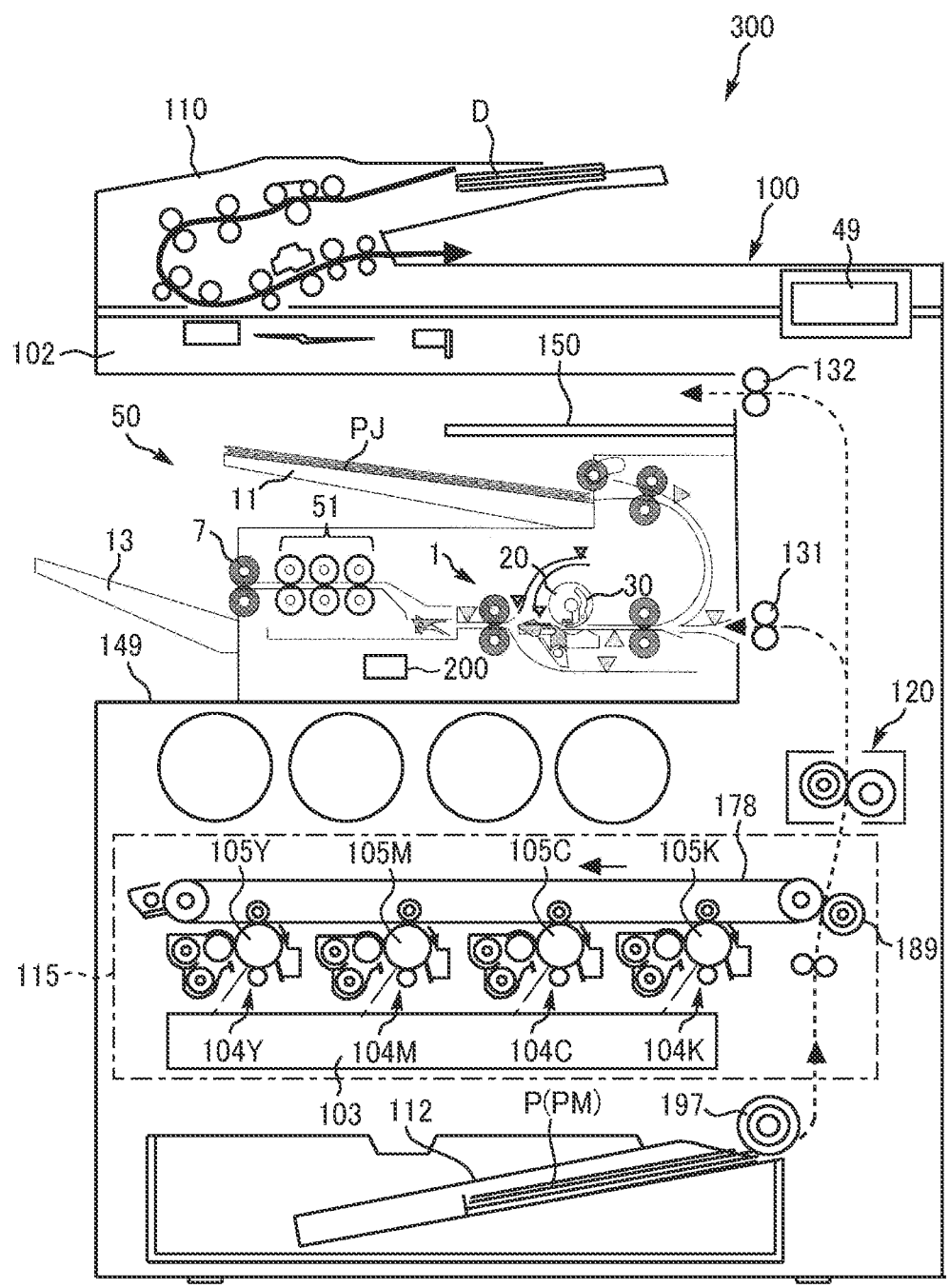
FIG. 19 is a diagram illustrating an image forming system according to Modification 1 of an embodiment of the present disclosure.

A description is given of an image forming system according to Modification 1 of the present embodiment, with reference to FIG. 19.

FIG. 19 is a diagram illustrating an image forming system according to Modification 1 of an embodiment of the present disclosure.

As illustrated in FIG. 19, an image forming system 300 according to Modification 1 includes the image forming apparatus 100 and the sheet laminator 50 that includes the sheet lamination device 51 and the sheet separation device 1. The sheet laminator 50 is detachably attached to the image forming apparatus 100.

In the image forming system 300 illustrated in FIG. 19, the image forming apparatus 100 performs the image forming operations on the sheet P, as described above with reference to FIG. 1. Then, the image forming apparatus 100 ejects the sheet P (that is, the inner sheet PM on which a desired image is formed) by the ejection roller pair 131 from the image forming apparatus 100 to the sheet laminator 50. After the sheet P is conveyed into the sheet laminator 50, the sheet P is inserted into the two-ply sheet PJ, where the sheet laminator 50 performs the sheet laminating operation on the two-ply sheet PJ. Then, the ejection roller pair 7 ejects the two-ply sheet PJ to the outside of the sheet laminator 50 to stack the two-ply sheet PJ on the ejection tray 13.

When the above-described sheet laminating operation is not performed, the image forming apparatus 100 of the image forming system 300 according to Modification 1 ejects the sheet P having the image formed in the image forming operations, from a second ejection roller pair 132 to the outside of the image forming apparatus 100, so as to stack the sheet P on a second ejection tray 150.

As described above, the sheet laminator 50 is detachably attached to the image forming apparatus 100. When the sheet laminator 50 is not used, the sheet laminator 50 may be detached from the image forming apparatus 100. When the sheet laminator 50 is detached from the image forming apparatus 100, a placement surface 149 on which the sheet laminator 50 was installed functions as an ejection tray. For example, when the sheet P is ejected from the ejection roller pair 131 to the outside of the image forming apparatus 100, the placement surface 149 stacks the sheet P on which a desired image is formed.

In the image forming system 300 having the above-described configuration, when a specific abnormal event occurs among a plurality of abnormal events that may occur in the image forming apparatus 100, the control mode (i.e., the lamination fixing temperature maintenance mode) in which heating by the heater 51b of the sheet lamination device 51 is maintained for the predetermined time Tz can be executed, and when an abnormal event other than the specific abnormal event occurs, heating by the heater 51b is interrupted.

As a result, the image forming system 300 can prevent deterioration of the productivity of the image forming system 300 when any abnormality occurs.

A description is given of an image forming system according to another embodiment of the present disclosure.

Figure 20:
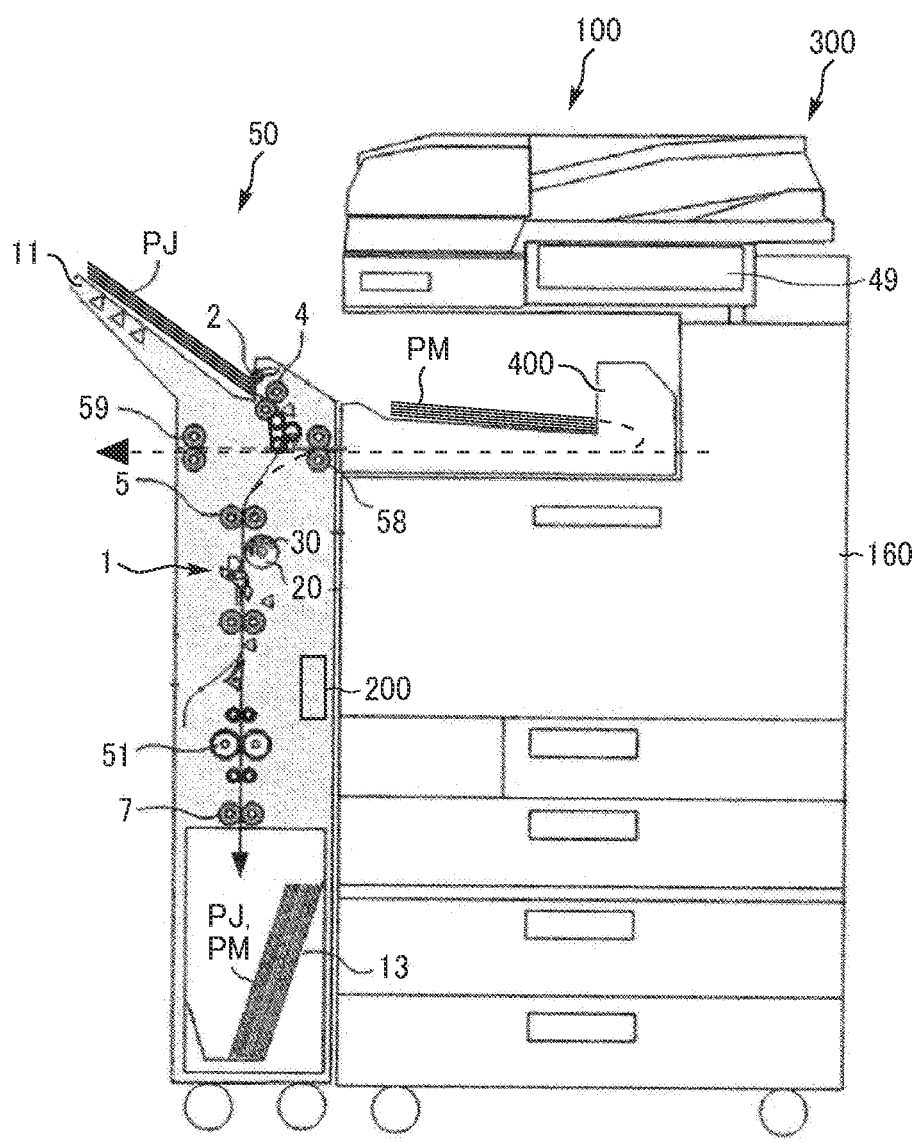
FIG. 20 is a diagram illustrating an image forming system according to another embodiment of the present disclosure.

FIG. 20 is a schematic view of an image forming system 300A according to another embodiment of the present disclosure.

In the image forming system 300 according to Modification 1, the sheet laminator 50 is detachably attached to the image forming apparatus 100, in the space under the document feeder 110.

As the image forming system 300A illustrated in FIG. 20, the sheet laminator 50 may be detachably attached adjacent to the image forming apparatus 100, in other words, the sheet laminator 50 may be detachably attached to the image forming apparatus 100 on the side to which the sheet P having an image on the surface is ejected. In such a configuration of the sheet laminator 50, the unit sheet tray 11 on which the two-ply sheets PJ are stacked, the sheet separation device 1 (winding roller 20), the sheet lamination device 51, and the ejection tray 13 are sequentially disposed in this order from top to bottom in the vertical direction. In addition to the sheet conveyance passage for guiding the inner sheet PM ejected from the image forming apparatus 100 to the sheet separation device 1 (winding roller 20), the sheet laminator 50 may be provided with another sheet conveyance passage (defined by sheet conveying roller pairs 58 and 59) for ejecting the sheet P ejected from the image forming apparatus 100 without performing the sheet laminating operation on the sheet P.

The sheet laminator 50 may also be provided with a relay device 400 that guides the sheet P (including the inner sheet PM) ejected from the image forming apparatus 100.

In this case, the inner sheet PM may be fed from the relay device 400.

Modification 2

Figure 21:
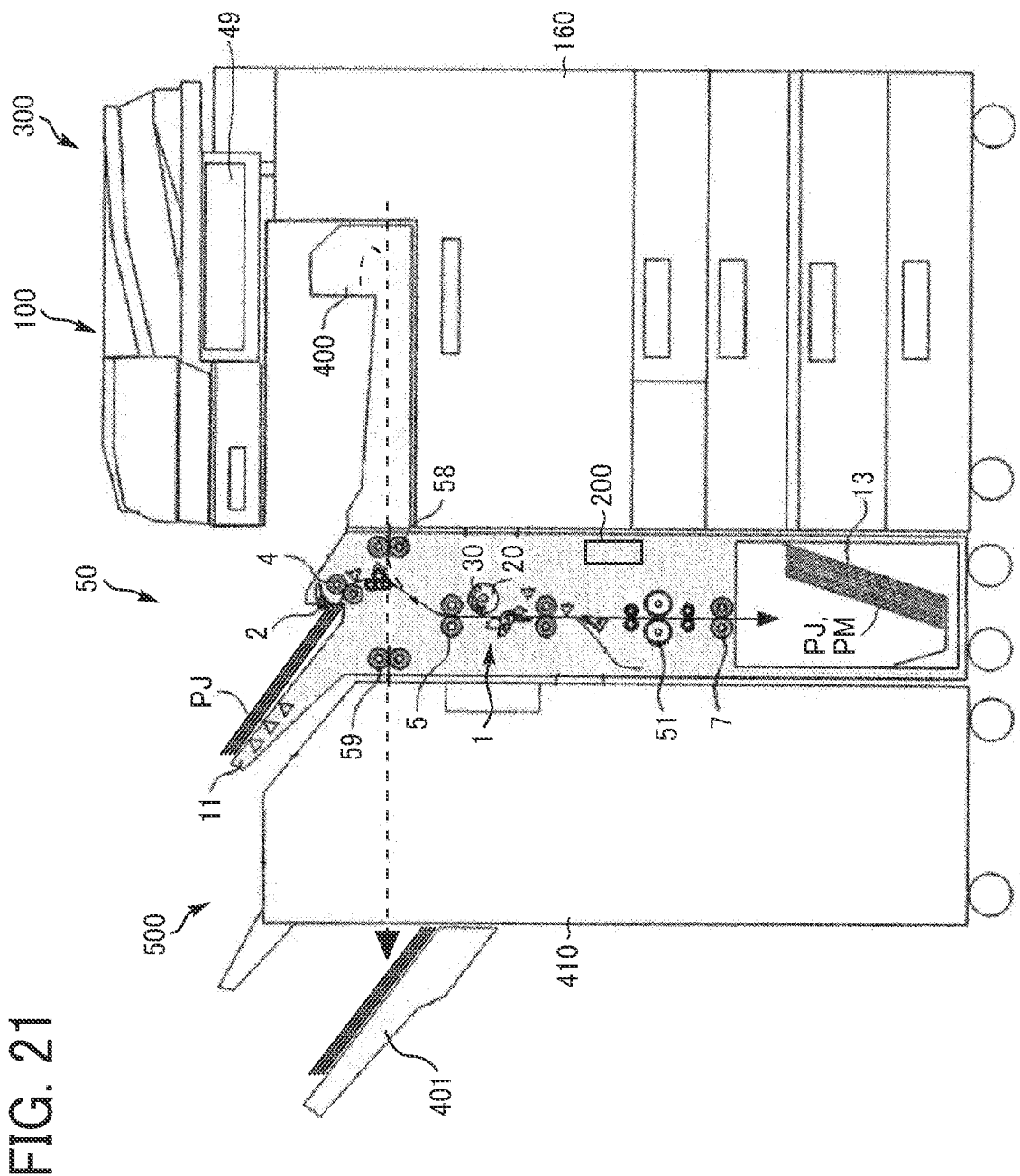
FIG. 21 is a diagram illustrating an image forming system according to Modification 2 of an embodiment of the present disclosure.

A description is given of an image forming system according to Modification 2, with reference to FIG. 21.

FIG. 21 is a diagram illustrating the image forming system 300 according to Modification 2 of an embodiment of the present disclosure.

As illustrated in FIG. 21, the image forming system 300 according to Modification 2 includes a post-processing apparatus 500 detachably attached to the image forming apparatus 100. The post-processing apparatus 500 perform the post-processing operations including the punching operation and the stapling operation, on the sheet P ejected from the image forming apparatus 100 through the sheet laminator 50. This sheet P is a sheet on which the sheet laminating operation is not performed.

In the image forming system 300 according to Modification 2, when a predetermined abnormal event occurs among a plurality of abnormal events that may occur in the post-processing apparatus 500, the "lamination fixing temperature maintenance mode (control mode)" can be executed. When an abnormal event other than the predetermined abnormal event occurs, heating by the heater 51b (heating unit) is interrupted (turned off).

The above-described "predetermined abnormal event" corresponds to at least one of paper jam or door opening. The paper jam is an abnormal condition in which the sheet P under conveyance is jammed in the post-processing apparatus 500 and the conveyance of the sheet P is stopped. The door opening is an abnormal condition in which a door 410 that is used to expose inside the post-processing apparatus 500 is opened during the post-processing operation of the post-processing apparatus 500 and the post-processing operation of the post-processing apparatus 500 is stopped.

More specifically, when a jam occurs in the post-processing apparatus 500 according to Modification 2 (at occurrence of j am), jam detection sensors disposed at positions in the sheet conveyance passage of the post-processing apparatus 500 detect the jam, and the operation of the post-processing apparatus 500 is stopped in response to detections of the jam. When the jammed sheet P is removed by the user, the removal of the jammed sheet P is detected by the jam detection sensor, and the operation of the post-processing apparatus 500 can be resumed.

Further, when the door 410 is forcedly opened (at door opening) while the post-processing apparatus 500 according to Modification 2 is under operation (including the state in which the main power source is simply turned on), the door opening is detected by the door detection sensor to stop the operation of the post-processing apparatus 500 (the post-processing operation cannot be performed). When the door 410 is closed by the user, the state is detected by the door detection sensor, and the operation of the post-processing apparatus 500 can be resumed.

Since these abnormal events are relatively minor abnormal conditions that the user can perform prompt handling (maintenance) to eliminate the abnormal events, the "lamination fixing temperature maintenance mode (control mode)" can be executed as described above. The "predetermined abnormal event" is not limited to the jam in the post-processing apparatus 500 and the door opening of the post-processing apparatus 500 but may be other minor abnormal conditions in the post-processing apparatus 500.

Figure 22:
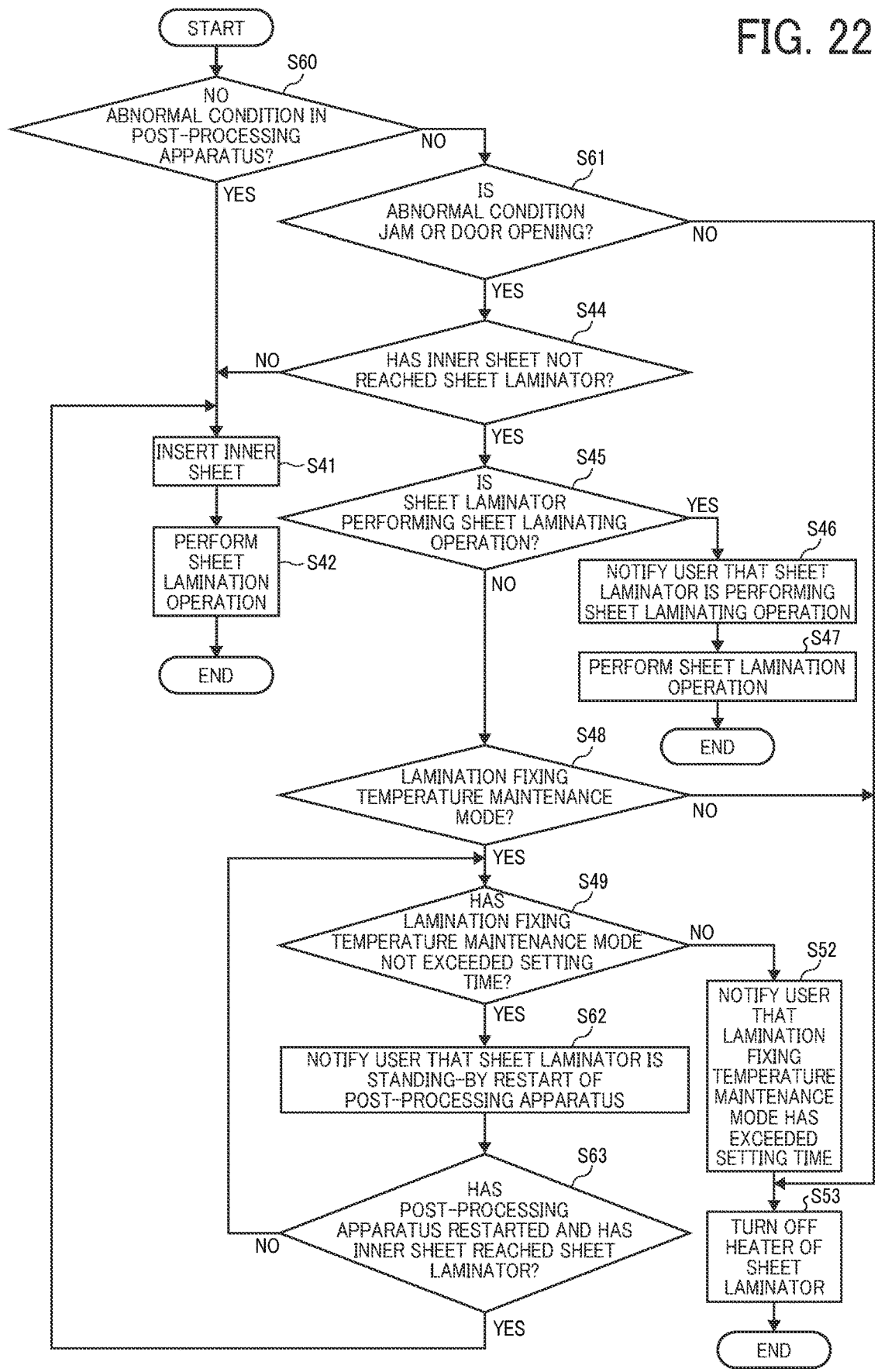
FIG. 22 is a flowchart illustrating a flow of a control process executed when any abnormal condition occurs in a post-processing apparatus.

FIG. 22 is a flowchart illustrating a flow of a control process executed when any abnormal condition occurs in the post-processing apparatus 500.

Figure 23:
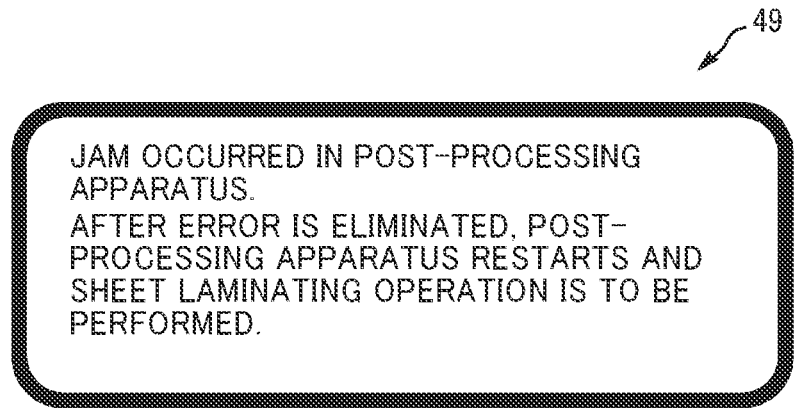
FIG. 23 is a diagram illustrating a display screen on the operation display panel related to the control process in the flowchart of FIG. 22.

FIG. 23 is a diagram illustrating a display on the operation display panel related to the control process in the flowchart of FIG. 22.

The flowchart of FIG. 22 is different from the flowchart of FIG. 17 in that: (1) the controller 200 determines whether or not there is an abnormal condition in the post-processing apparatus 500 in step S60; (2) the controller 200 determines whether or not the abnormal condition in the post-processing apparatus 500 is a predetermined abnormal event (a paper jam or door opening) in step S61; (3) the controller 200 causes the operation display panel 49 to display the message indicating that the post-processing apparatus 500 is waiting to be restarted in step S62 (see FIG. 23), and (4) the controller 200 determines whether or not the inner sheet PM has reached the sheet laminator 50 after the post-processing apparatus 500 is restarted in step S63.

The image forming system 300 having the above-described condition can reduce or prevent the inconvenience in which the productivity of the image forming apparatus 100 deteriorates when the abnormal condition occurs in the image forming apparatus 100 and the inconvenience in which the productivity of the post-processing apparatus 500 when the abnormal condition occurs in the post-processing apparatus 500.

As illustrated in FIG. 21, the sheet laminator 50 according to Modification 2 includes the ejection tray 13 serving as an ejection unit from which the sheet P (including the inner sheet PM) conveyed from the image forming apparatus 100 can be removed.

In Modification 2, when a predetermined abnormal event (i.e., a relatively minor abnormal event such as a jam or door opening) occurs among a plurality of abnormal events that can occur in the post-processing apparatus 500 and the sheet P on which no post-processing operation is to be performed is conveyed from the image forming apparatus 100 (i.e., when a regular print mode or a sheet lamination mode without the post-processing operation is set as the next job), the sheet P (or the two-ply sheet PJ and the inner sheet PM after the sheet laminating operation) is not ejected through the post-processing apparatus 500 (i.e., the sheet P is not ejected to the ejection tray 401 of the post-processing apparatus 500) but is ejected to the ejection tray 13 serving as an ejection unit of the sheet laminator 50.

In other words, when a relatively minor abnormal condition that does not require primary maintenance of the post-processing apparatus 500 occurs in the post-processing apparatus 500, the user can change the destination of conveyance of the sheet P while the print job is being performed.

Figure 24:
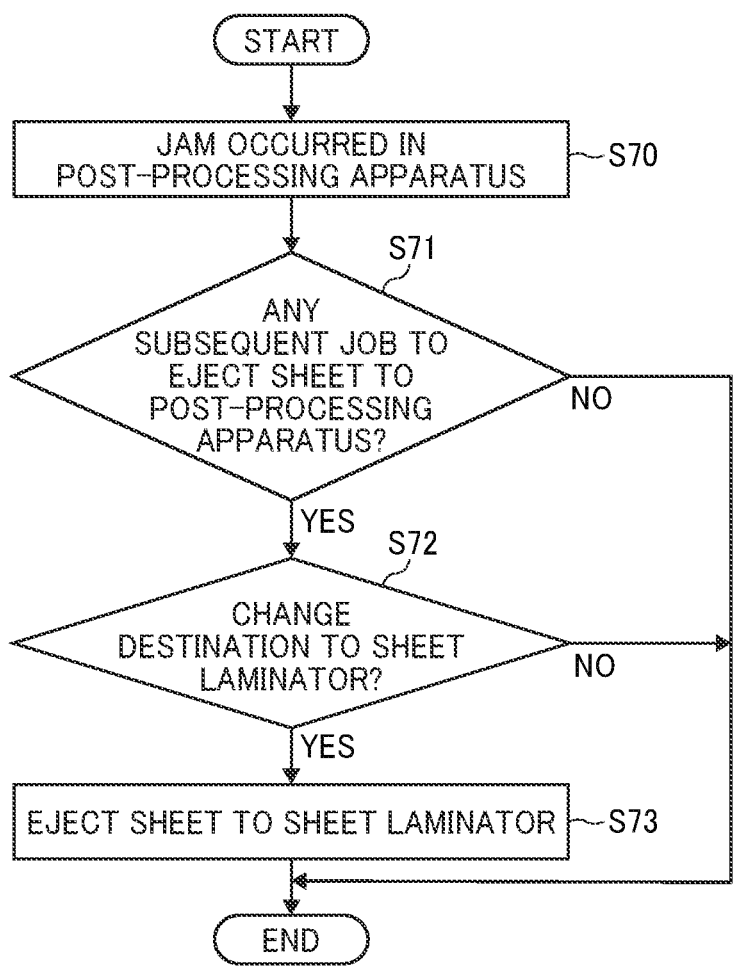
FIG. 24 is a flowchart illustrating a flow of another control process executed when any abnormal condition occurs in the post-processing apparatus.

FIG. 24 is a flowchart illustrating a flow of another control process executed when any abnormal condition occurs in the post-processing apparatus 500.

Figure 25A:
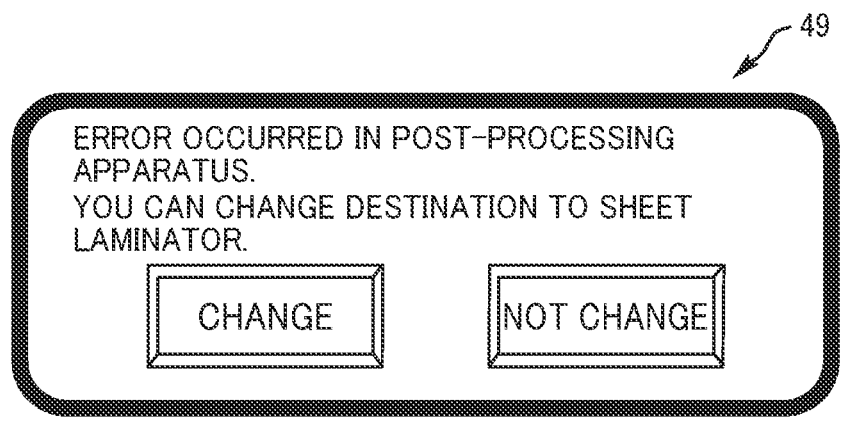
FIGS. 25A and 25B are diagrams, each illustrating a display screen on the operation display panel related to the control process in the flowchart of FIG. 24.
Figure 25B:
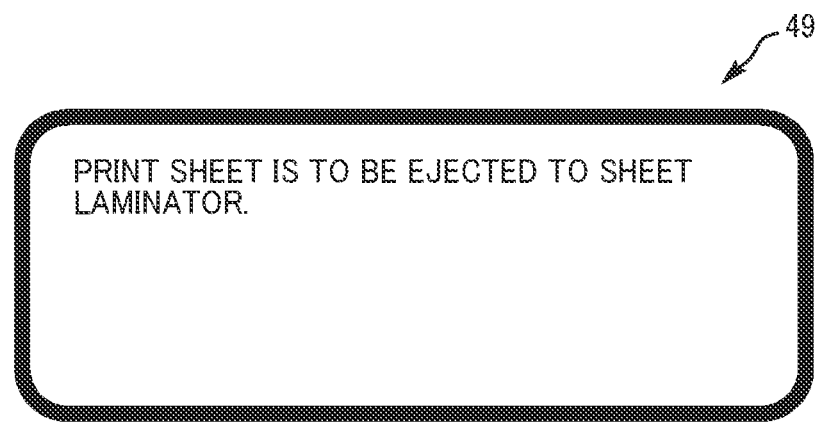

FIGS. 25A and 25B are diagrams, each illustrating a display on the operation display panel 49 related to the control process in the flowchart of FIG. 24.

More specifically, an operator such as a user or a service person operates the operation display panel 49 to open a setting screen (see FIG. 25A) for setting whether or not to change the sheet ejection destination when a predetermined abnormal event occurs in the post-processing apparatus 500, and then sets the change or no change of the sheet ejection destination.

More specifically, as illustrated in FIG. 24, the controller 200 determines that a predetermined abnormal condition such as paper jam occurs in the post-processing apparatus 500 has occurred (step S70). Then, the controller 200 determines whether there is the subsequent job to eject the sheet P to the ejection tray 401 of the post-processing apparatus 500 (step S71). When there is no subsequent job to eject the sheet P to the ejection tray 401 of the post-processing apparatus 500 (NO in step S71), the control process of the flowchart in FIG. 24 ends. When there is the subsequent job to eject the sheet P to the ejection tray 401 of the post-processing apparatus 500 (YES in step S71), the controller 200 determines whether the sheet ejection destination has been changed based on the setting screen illustrated in FIG. 25A (step S72). When the sheet ejection destination has not been changed based on the setting screen (NO in step S72), the control process of the flowchart in FIG. 24 ends. When the sheet ejection destination has been changed based on the setting screen (YES in step S72), the sheet P for the subsequent job is ejected to the ejection tray 13 of the sheet laminator 50 (step S73). At this time, as illustrated in FIG. 25B, the display screen of the operation display panel 49 displays the message indicating that the sheet P (printed sheet) is ejected to the ejection tray 13 of the sheet laminator 50.

Executing the above-described control process can reduce or prevent the inconvenience in which the image forming system 300 shuts down due to the abnormal condition of the post-processing apparatus 500 to result in deterioration of the productivity of the post-processing apparatus 500 and the image forming system 300.

As described above, the image forming system 300 according to the present embodiment includes the image forming apparatus 100 and the sheet lamination device 51. The image forming apparatus 100 forms an image on the surface of the sheet PM (sheet P) that is under conveyance. The sheet lamination device 51 performs the sheet laminating operation by heating the two-play sheet PJ by the heater 51b (heating unit) on the two-ply sheet PJ while the sheet P as the inner sheet PM conveyed from the image forming apparatus 100 is inserted between the two sheets P1 and P2 of the two-ply sheet PJ. When a specific abnormal event occurs among a plurality of abnormal events that may occur in the image forming apparatus 100, a control mode (lamination fixing temperature maintenance mode) in which heating of the sheet lamination device 51 by the heater 51b is maintained for the predetermined time Tz can be executed. When an abnormal event other than the specific abnormal event occurs, heating by the heater 51b is interrupted.

As a result, the image forming system 300 can reduce or prevent deterioration of the productivity of the image forming system 300 when any abnormal condition occurs.

The image forming apparatus 100 and the image forming system 300 according to an embodiment of the present disclosure employs a color image forming apparatus but the configuration of the image forming apparatus and the image forming system are not limited to the above-described configurations. For example, a monochrome image forming apparatus and a monochrome image forming system are also applicable to achieve the effect of the present disclosure. In the present embodiment, the image forming apparatus 100 is an electrophotographic image forming apparatus and the image forming system 300 includes the electrophotographic image forming apparatus 100. However, embodiments of the present disclosure are not limited to the electrophotographic image forming apparatus. In some embodiment, for example, the image forming apparatus may be an image forming apparatus of another system (for example, an image forming apparatus of an inkjet system or a stencil printer).

In the present embodiment, a post-processing apparatus can be disposed to the image forming apparatus 100 including the sheet laminator 50 illustrated in FIG. 1.

In the above-described embodiments, the heater 51b serving as a heating unit is employed in the sheet lamination device 51. However, the heating unit in the sheet lamination device is not limited to the heater 51b. For example, the heating unit may be an electromagnetic induction coil or a resistive heat generator.

Any of the cases described above exhibits substantially the same advantages as the advantages of the present embodiment.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

Note that, in the present disclosure, the "end face" of the two-ply sheet is defined as a side face extending in the thickness direction and connecting the front face and the back face of the two-ply sheet. Accordingly, there are four end faces of the rectangular two-ply sheet on the front, back, left, and right.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming system comprising:
an image forming apparatus configured to form an image on a sheet being conveyed as an inner sheet;
a sheet laminator configured to perform a sheet laminating operation on a two-ply sheet in which the inner sheet conveyed from the image forming apparatus is inserted between two sheets of the two-ply sheet,
the sheet laminator including
a heater to heat the two-ply sheet during the sheet laminating operation; and
circuitry configured to:
execute a control mode when a specific abnormal event occurs among a plurality of abnormal events that occurs in the image forming apparatus, where the control mode maintains heating by the heater of the sheet laminator for a predetermined time, and
interrupt the heating by the heater when an abnormal event other than the specific abnormal event occurs.

2. The image forming system according to claim 1, wherein the specific abnormal event indicates at least one of an abnormal condition in which the sheet under conveyance in the image forming apparatus is jammed and the conveyance of the sheet is stopped or another abnormal condition in which a door used to expose an inside of the image forming apparatus is opened during an image forming operation of the image forming apparatus and the image forming operation of the image forming apparatus is stopped.

3. The image forming system according to claim 1, wherein the circuitry is configured to execute the control mode to maintain a temperature of the heating by the heater within a predetermined range.

4. The image forming system according to claim 1, wherein the circuitry is configured to execute the control mode to interrupt the heating by the heater after the predetermined time has elapsed.

5. The image forming system according to claim 1, wherein the predetermined time to execute the control mode is set to a desired value.

6. The image forming system according to claim 1, wherein interruption of the heating by the heater without executing the control mode is selectable when the specific abnormal event occurs.

7. The image forming system according to claim 1, wherein the circuitry is configured to continue the sheet laminating operation when the specific abnormal event occurs while the sheet laminating operation is being performed in the sheet laminator.

8. The image forming system according to claim 1, wherein the sheet laminator includes
a sheet separation device configured to separate a non-bonding portion of the two-ply sheet in which the two sheets are overlapped and bonded together at a bonding portion of the two-ply sheet; and
a sheet lamination device to heat the two-ply sheet with the inner sheet being inserted between the two sheets separated from each other by the sheet separation device, and
wherein the sheet separation device is upstream from the sheet lamination device in a sheet conveyance direction the sheet conveyance direction in which the two-ply sheet is conveyed.

9. The image forming system according to claim 1, wherein the sheet laminator is detachably attached to the image forming apparatus.

10. The image forming system according to claim 9, wherein the sheet laminator includes
a sheet separation device configured to separate a non-bonding portion of the two-ply sheet in which the two sheets are overlapped and bonded together at a bonding portion of the two-ply sheet; and
a sheet lamination device to heat the two-ply sheet with the inner sheet being inserted between the two sheets separated from each other by the sheet separation device.

11. The image forming system according to claim 9, further comprising a post-processing apparatus configured to perform a post-processing operation on the sheet ejected from the image forming apparatus through the sheet laminator,
wherein the circuitry is configured to:
execute the control mode when a predetermined abnormal event occurs among a plurality of abnormal events that occurs in the post-processing apparatus, and
interrupt the heating by the heater when an abnormal event other than the predetermined abnormal event occurs.

12. The image forming system according to claim 11, wherein the specific abnormal event indicates at least one of an abnormal condition in which the sheet under conveyance in the post-processing apparatus is jammed and the conveyance of the sheet is stopped or another abnormal condition in which a door used to expose an inside of the post-processing apparatus is opened during a post-processing operation of the post-processing apparatus and the post-processing operation of the post-processing apparatus is stopped.

13. The image forming system according to claim 11, further comprising an ejection unit from which the sheet conveyed from the image forming apparatus is removed,
wherein ejection of the sheet to the ejection unit without passing through the post-processing apparatus is selectable when the predetermined abnormal event occurs among the plurality of abnormal events that occurs in the post-processing apparatus and the sheet on which no post-processing operation is to be performed is conveyed from the image forming apparatus.

* * * * *